United States Patent [19]

Hirzel et al.

[11] Patent Number: 4,671,650
[45] Date of Patent: Jun. 9, 1987

[54] APPARATUS AND METHOD FOR DETERMINING AIRCRAFT POSITION AND VELOCITY

[75] Inventors: Edgar A. Hirzel, Granada Hills; Douglas M. Longyear, Jr., Pasadena, both of Calif.

[73] Assignee: Crane Co. (Hydro-Aire Division), New York, N.Y.

[21] Appl. No.: 620,505

[22] Filed: Jun. 14, 1984

Related U.S. Application Data

[63] Continuation-in-part of Ser. No. 419,996, Sep. 20, 1982, Pat. No. 4,495,589.

[51] Int. Cl.⁴ .......................... G01P 3/36; G01P 3/42; G01C 3/08
[52] U.S. Cl. ........................................ 356/28; 356/4; 324/160
[58] Field of Search ............... 356/28, 27, 4; 358/105; 382/10; 364/424, 433; 324/160, 175

[56] References Cited

U.S. PATENT DOCUMENTS

| | | |
|---|---|---|
| 2,866,373 | 12/1958 | Doyle et al. |
| 2,944,154 | 7/1960 | Bosch |
| 2,968,034 | 1/1961 | Cafarelli, Jr. |
| 3,004,219 | 10/1961 | Albert |
| 3,023,361 | 2/1962 | Conner, Jr. |
| 3,144,497 | 8/1964 | Hamilton ........................... 356/28 |
| 3,155,974 | 11/1964 | Seling |
| 3,364,485 | 1/1963 | Chiarello |
| 3,366,960 | 1/1968 | Gluck |

(List continued on next page.)

OTHER PUBLICATIONS

Hydro-Aire Document "Remote Ground Speed Sensing and Navigation System".
Fourier Series and Integrals, Sec. 9, "Correlation Functions", pp. 171-177 TRW, Multiplier-Accumulators--Parallel 8, 12 or 16 Bits:, 1979, 1981.

(List continued on next page.)

Primary Examiner—Stephen C. Buczinski
Assistant Examiner—Melissa Koltak
Attorney, Agent, or Firm—Willian Brinks Olds Hofer Gilson & Lione

[57] ABSTRACT

An apparatus and method for determining aircraft position and velocity is disclosed. The system includes two CCD sensors which take overlapping front and back radiant energy images of front and back overlapping areas of the earth's surface. A signal processing unit digitizers and deblurs the data that comprise each image. The overlapping first and second front images are then processed to determine the longitudinal and lateral relative image position shifts that produce the maximum degree of correlation between them. The signal processing unit then compares the first and second back overlapping images to find the longitudinal and lateral relative image position shifts necessary to maximize the degree of correlation between those two images. Various correlation techniques, including classical correlation, differencing correlation, zero-mean correction, normalization, windowing, and parallel processing are disclosed for determining the relative image position shift signals between the two overlapping images. The front longitudinal relative image position shift signal, the front lateral relative image position shift signal, the back longitudinal relative image position shift signal and the back lateral relative image position shift signal are then corrected by an altitude factor to respectively produce a front longitudinal ground distance signal, a front lateral ground distance signal, a back longitudinal ground distance signal, and a back lateral ground distance signal. These ground distance signals can be divided by the time delay between forming the first and second images to produce longitudinal and lateral ground velocity signals. The longitudinal and lateral ground distance signals can also be processed to produce other navigational measurements, such as the yaw, rotation, roll and ground track of the aircraft. The ground distance data and navigational measurements may be error checked against independent data and output to various displays.

8 Claims, 13 Drawing Figures

U.S. PATENT DOCUMENTS

| | | |
|---|---|---|
| 3,545,268 | 12/1970 | Von Struve III . |
| 3,603,691 | 9/1971 | Hamilton . |
| 3,653,694 | 4/1972 | Albright . |
| 3,804,517 | 4/1974 | Meyr et al. . |
| 3,819,919 | 6/1974 | McGunigle . |
| 3,824,015 | 7/1974 | Petit et al. . |
| 3,885,873 | 5/1975 | Andermo . |
| 3,908,116 | 9/1975 | Bjornsen . |
| 3,918,814 | 11/1975 | Weiser . |
| 3,974,500 | 8/1976 | Goldfischer . |
| 4,014,293 | 8/1977 | Kihlberg . |
| 4,017,721 | 4/1977 | Michaud . |
| 4,106,731 | 8/1978 | Bliss . |
| 4,146,924 | 3/1979 | Birk et al. . |
| 4,162,509 | 7/1979 | Robertson . |
| 4,257,703 | 3/1981 | Goodrich ............................... 356/28 |
| 4,269,512 | 5/1981 | Nosler . |
| 4,309,104 | 1/1982 | Prinz et al. . |
| 4,312,071 | 1/1982 | Bloch . |
| 4,319,845 | 3/1982 | Shuji . |
| 4,410,261 | 10/1983 | Masunaga et al. . |
| 4,495,589 | 1/1985 | Hirzel ..................................... 356/28 |
| 4,580,894 | 4/1986 | Wojcik ................................... 356/28 |

OTHER PUBLICATIONS

Seven Engineering Corporation, Engineering Problem Solver, "Final Report, Promising Feature Extraction Using CCD Camera"–2/11/82.

Reticon "R5401 Binary Analog Correlator".

Reticon "R5403 Analog—Analog Correlator/Convolver".

*Aviation Week & Space Technology*, pp. 68–70 (8/30/82).

FIG. 4a

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 46 | 290 | 38 | 4 | 273 | 86 | 139 | 193 | 31 | 110 | 80 | 269 | 229 | 220 | 114 | 159 |
| 2 | 120 | 14 | 124 | 144 | 146 | 111 | 171 | 9 | 205 | 73 | 83 | 217 | 250 | 138 | 163 | 16 |
| 3 | 208 | 187 | 17 | 262 | 125 | 132 | 16 | 170 | 236 | 230 | 278 | 294 | 63 | 124 | 175 | 23 |
| 4 | 129 | 204 | 166 | 116 | 12 | 198 | 256 | 43 | 209 | 87 | 175 | 71 | 32 | 40 | 93 | 260 |
| 5 | 230 | 283 | 45 | 291 | 135 | 286 | 194 | 119 | 131 | 275 | 111 | 247 | 146 | 274 | 85 | 129 |
| 6 | 181 | 270 | 253 | 98 | 146 | 295 | 262 | 214 | 235 | 151 | 47 | 243 | 21 | 240 | 242 | 160 |
| 7 | 178 | 232 | 113 | 271 | 220 | 52 | 214 | 68 | 79 | 198 | 169 | 7 | 96 | 175 | 283 | 205 |
| 8 | 41 | 164 | 75 | 269 | 161 | 206 | 30 | 249 | 47 | 220 | 288 | 11 | 134 | 242 | 151 | 43 |
| 9 | 116 | 285 | 212 | 78 | 295 | 132 | 215 | 46 | 148 | 251 | 142 | 53 | 127 | 229 | 12 | 279 |
| 10 | 75 | 139 | 222 | 207 | 274 | 33 | 1 | 176 | 13 | 247 | 291 | 153 | 287 | 148 | 260 | 239 |
| 11 | 112 | 96 | 31 | 192 | 275 | 31 | 40 | 80 | 102 | 89 | 21 | 261 | 154 | 239 | 12 | 78 |
| 12 | 48 | 150 | 86 | 91 | 100 | 179 | 15 | 24 | 197 | 183 | 45 | 248 | 94 | 62 | 110 | 174 |
| 13 | 230 | 219 | 162 | 189 | 176 | 151 | 129 | 199 | 8 | 263 | 98 | 211 | 95 | 8 | 122 | 232 |
| 14 | 27 | 148 | 257 | 97 | 155 | 48 | 213 | 121 | 66 | 284 | 141 | 172 | 72 | 88 | 142 | 178 |
| 15 | 236 | 6 | 295 | 249 | 215 | 295 | 22 | 130 | 230 | 128 | 61 | 80 | 164 | 240 | 185 | 168 |
| 16 | 76 | 88 | 126 | 105 | 56 | 43 | 135 | 194 | 284 | 201 | 270 | 105 | 135 | 27 | 195 | 278 |

FIG. 4b

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 194 | 124 | 7 | 130 | 205 | 168 | 118 | 13 | 197 | 258 | 43 | 208 | 88 | 178 | 72 | 34 |
| 2 | 291 | 267 | 271 | 231 | 283 | 46 | 292 | 137 | 286 | 195 | 120 | 132 | 277 | 110 | 249 | 147 |
| 3 | 82 | 90 | 215 | 180 | 270 | 253 | 98 | 145 | 296 | 262 | 216 | 237 | 150 | 46 | 243 | 23 |
| 4 | 201 | 110 | 59 | 180 | 234 | 114 | 270 | 221 | 51 | 214 | 70 | 81 | 199 | 169 | 7 | 96 |
| 5 | 297 | 290 | 108 | 42 | 164 | 75 | 268 | 163 | 208 | 30 | 250 | 48 | 222 | 290 | 10 | 134 |
| 6 | 239 | 262 | 174 | 117 | 285 | 211 | 79 | 294 | 132 | 216 | 45 | 147 | 250 | 142 | 54 | 127 |
| 7 | 288 | 14 | 184 | 77 | 139 | 221 | 108 | 275 | 33 | 1 | 176 | 15 | 246 | 290 | 154 | 286 |
| 8 | 190 | 65 | 68 | 114 | 96 | 33 | 193 | 277 | 31 | 42 | 79 | 102 | 91 | 22 | 263 | 156 |
| 9 | 218 | 177 | 293 | 47 | 151 | 86 | 92 | 99 | 180 | 15 | 26 | 197 | 182 | 46 | 248 | 96 |
| 10 | 74 | 20 | 85 | 229 | 221 | 164 | 190 | 75 | 153 | 130 | 198 | 8 | 262 | 100 | 213 | 94 |
| 11 | 161 | 254 | 207 | 29 | 148 | 258 | 96 | 157 | 147 | 212 | 122 | 66 | 284 | 143 | 173 | 72 |
| 12 | 76 | 163 | 192 | 235 | 5 | 296 | 249 | 215 | 295 | 23 | 130 | 229 | 130 | 61 | 79 | 163 |
| 13 | 24 | 290 | 296 | 78 | 88 | 125 | 106 | 58 | 45 | 135 | 196 | 286 | 203 | 269 | 106 | 136 |
| 14 | 22 | 222 | 248 | 125 | 121 | 158 | 286 | 200 | 225 | 38 | 62 | 256 | 133 | 258 | 230 | 172 |
| 15 | 249 | 282 | 174 | 32 | 255 | 15 | 263 | 257 | 132 | 228 | 222 | 283 | 37 | 28 | 148 | 198 |
| 16 | 138 | 288 | 86 | 283 | 166 | 216 | 166 | 272 | 159 | 191 | 162 | 110 | 34 | 123 | 230 | 82 |

FIG. 5

| | 1 | 2 | 3 | 4 | 5 | 6 | 7 | 8 | 9 | 10 | 11 | 12 | 13 |
|---|---|---|---|---|---|---|---|---|---|---|---|---|---|
| 1 | 1 | 1 | 0 | 0 | 0 | 5 | 0 | 0 | 1 | 1 | 0 | 3 | 0 |
| 2 | 0 | 1 | 0 | 3 | 0 | 0 | 0 | 1 | 0 | 4 | 0 | 0 | 0 |
| 3 | 0 | 0 | 0 | 0 | 0 | 0 | 1 | 0 | 3 | 0 | 2 | 0 | 0 |
| 4 | 0 | 3 | 0 | 0 | 0 | 0 | 0 | 2 | 0 | 9 | 0 | 0 | 2 |
| 5 | 0 | 1 | 1 | 3 | 1 | 0 | 0 | 0 | 3 | 0 | 3 | 0 | 0 |
| 6 | 0 | 4 | 0 | 1 | 3 | 0 | 0 | 1 | 0 | 5 | 0 | 2 | 0 |
| 7 | 1 | 0 | 3 | 0 | 0 | 0 | 0 | 1 | 0 | 3 | 0 | 3 | 0 |
| 8 | 0 | 2 | 0 | 2 | 1 | 0 | 1 | 2 | 0 | 1 | 0 | 2 | 0 |
| 9 | 0 | 0 | 6 | 0 | 0 | 1 | 0 | 2 | 0 | 4 | 0 | 2 | 0 |
| 10 | 0 | 0 | 0 | 3 | 0 | 0 | 2 | 0 | 3 | 0 | 0 | 0 | 0 |
| 11 | 0 | 0 | 4 | 0 | 0 | 0 | 0 | 2 | 0 | 1 | 2 | 0 | 0 |
| 12 | 0 | 0 | 0 | 5 | 0 | 0 | 0 | 5 | 0 | 0 | 0 | 0 | 2 |
| 13 | 0 | 0 | 2 | 0 | 2 | 0 | 0 | 0 | 0 | 0 | 1 | 0 | 1 |

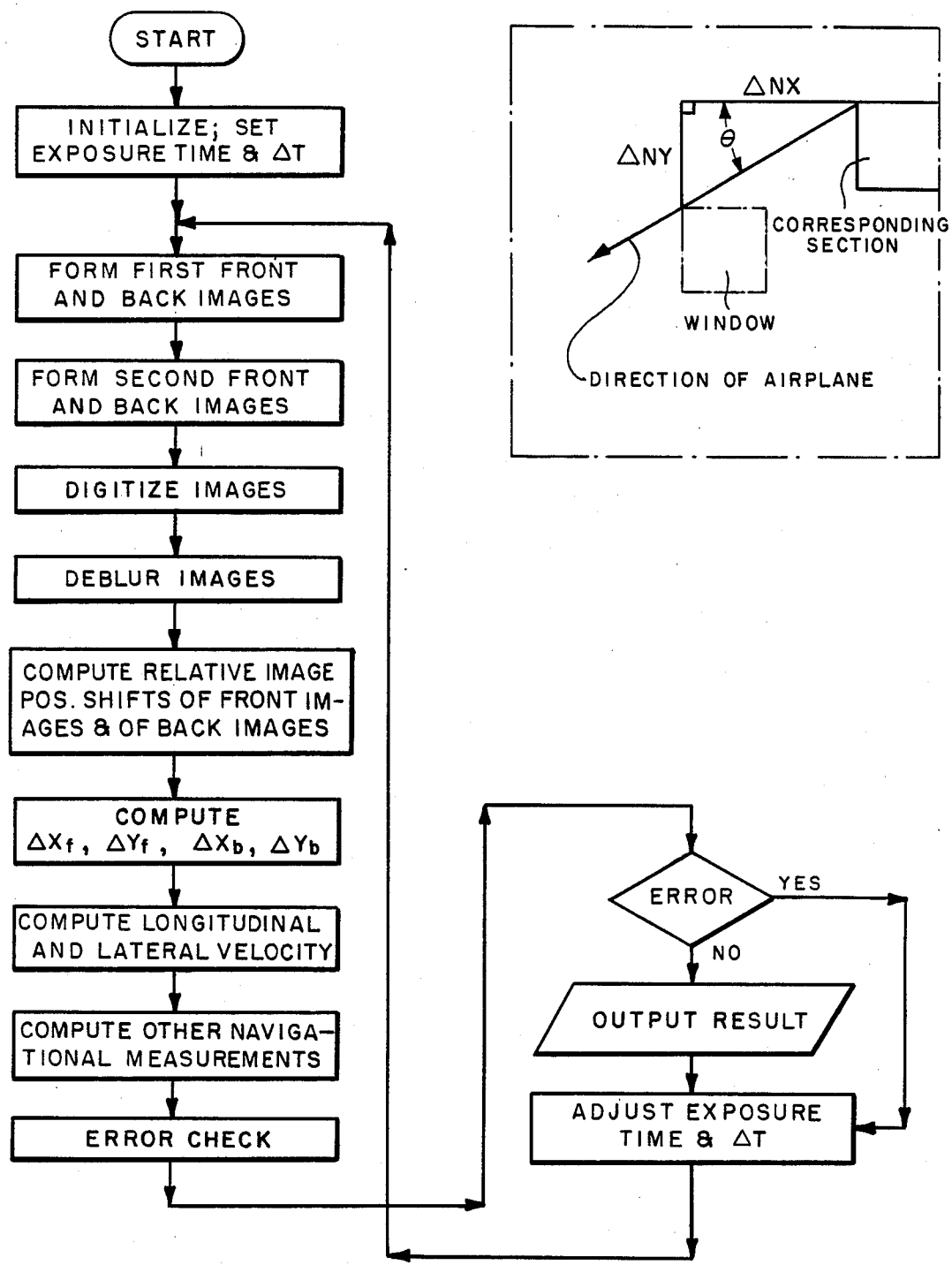

APPARATUS AND METHOD FOR DETERMINING AIRCRAFT POSITION AND VELOCITY

This application is a continuation-in-part of application Ser. No. 419,996, filed Sept. 20, 1982, now U.S. Pat. No. 4,495,589, issued Jan. 22, 1985.

BACKGROUND OF THE INVENTION

The present invention relates to an apparatus and method for determining aircraft velocity and position, and more particularly, to an apparatus and method for determining the longitudinal and lateral ground velocity of an aircraft and for providing positional data for navigation of the aircraft.

Knowledge of an aircraft's velocity with respect to the ground provides important data that is useful for safe navigation. For example, during aircraft landings actual ground speed data is essential for the proper operation of the wheel brake antiskid control system, and more specifically the hydroplaning and touchdown spin-up logic thereof. An aircraft's ground speed can also be compared to a conventional barometric air speed reference to detect wind shear conditions.

Information of an aircraft's position with respect to the ground can also be useful for navigation. Such data can be used to track the location and path of the aircraft over the ground. Deviations between the actual and planned flight paths indicate whether the aircraft is off course. Ground position data can also be used to stabilize an aircraft. For example, when an aircraft rolls side-to-side about the longitudinal axis defined by its fuselage, it creates a sinusoidal flight path with respect to the ground. The frequency and amplitude of this sinusoidal path are proportional to the roll frequency and roll angle of the aircraft. The roll frequency and roll angle may be determined from ground position data corresponding to the sinusoidal flight path, thereby allowing the pilot to take corrective measures.

One known means for determining velocity of an aircraft is shown in U.S. Pat. No. 4,162,509 (Robertson). This reference discloses a pair of photodiode array cameras which are mounted a fixed distance apart on a vehicle. The first camera makes a first image of the earth's surface, and at some interval later the second camera makes a second image of the earth's surface. A correlator makes an element-by-element comparison of the two images to see if they correspond to the same area of the earth's surface. If not, the time interval is adjusted, and new images are made and correlated. The velocity of the aircraft is determined by dividing the known distance between the cameras by the time interval which produces complete correlation.

While the Robertson system provides a measure of ground velocity, it also has several disadvantages. First, Robertson continually samples and correlates data until complete correlation is achieved. The more data sampled and correlated the slower the update time for computing velocity. This process is also prone to error because it repeatedly disregards existing data and samples new data. Second, Robertson will have difficulty achieving complete correlation when the vehicle is rapidly accelerating or decelerating because the time interval necessary to achieve complete correlation will be changing. Third, Robertson only teaches how to determine the velocity of the aircraft in one dimension at high velocity. This reference suggests that velocity can be determined in two dimensions at low velocities, but it is not clear how this is done.

Another shortcoming of the Robertson system is that it is subject to motion blurring because its cameras consist of photodiode array image sensors. When the aircraft is moving, incident light will be spatially blurred over a plurality of photodiode elements. In effect, motion blurring is due to the integration of a scene translated photodiode-by-photodiode over the distance corresponding to the aircraft velocity multiplied by the exposure time. Thus, a point source of light will be recorded as a bar over a plurality of photodiodes, wherein each photodiode has an exposure level which is only a fraction of the level to be expected by a record of a stationary scene. This blurring acts as a low pass filter which reduces the feature definition and limits the sharpness of a correlation calculation. This phenomenon will be particularly noticeable at low levels of radiation requiring a long exposure time.

U.S. Pat. No. 3,545,268 (Von Struve) discloses a satellite ground track alignment sensor. According to the disclosure, a satellite is provided with two front sensors and two back sensors having divergent axes that all project towards the earth's surface. The sensors detect characteristic signatures of the earth's surface, such as an infrared signature. The output of a first front sensor is delayed by the time it takes its corresponding back sensor to view the same area of the earth's surface. The outputs of these two sensors are correlated. If the satellite is properly oriented with respect to its projected surface ground track, the outputs of the front and back sensors should exactly match. If however, there is a heading error, the correlation calculation of the front and back sensors will yield the magnitude of the heading error. The output of each front sensor is also correlated with the output of its diagonally disposed back sensor. These two resulting correlation calculations are compared to determine the polarity of the heading error with respect to the ground track.

The Von Struve system is limited to determining the magnitude and polarity of misalignment from a projected surface ground track. The reference does not teach how to generate ground position data that could be useful for making other navigational determinations (e.g. roll frequency). Moreover, the Von Struve system is also subject to some of the shortcomings of the Robertson system. For example, Von Struve must provide a means to adjust the time delay when the satellite is accelerating or decelerating.

SUMMARY OF THE INVENTION

The present invention is directed to an apparatus and method for providing aircraft ground velocity and ground position data.

According to this invention, a first means is provided for detecting a first radiant energy image from a first area of the earth's surface, and after a time delay, a second radiant energy image from a second area of the earth's surface which overlaps the first area. These two images are processed along with an altitude signal and the time delay to produce a longitudinal ground velocity signal and a lateral ground velocity signal.

A second means is also provided for detecting a radiant energy image from an area of the earth's surface. The first detecting means and the second detecting means cooperate to simultaneously generate a first front and a first back radiant energy images, respectively. Following the time delay, the first and second detecting means cooperate to simultaneously generate second front and second back radiant energy images, respectively. The first front image and the second front image overlap, and the first back image and the second back image overlap. These four images are processed with the altitude signal to produce front and back longitudinal ground distance signals and front and back lateral ground distance signals.

The preferred embodiment of the invention includes both front and back photodiode arrays to simultaneously form first front and back images and, after a time delay, second front and back images. Each image is digitized into a plurality of discrete values. The digitized images are deblurred, and at least one window is selected from each image for processing. A processing means correlates the windows of the first and second front images to produce a front longitudinal position shift signal and a front lateral position shift signal, and the windows of the first and second back images to produce a back longitudinal position shift signal and a back lateral position shift signal. These four position shift signals are then corrected by the altitude signal to respectively produce a front longitudinal ground distance signal, a front lateral ground distance signal, a back longitudinal ground distance signal and a back lateral ground distance signal.

The processing means may correlate by multiplying corresponding digital values in the front windows and corresponding digital values in the back windows and summing the products, or subtracting corresponding digital values in the front windows from corresponding digital values in the back windows and summing the absolute values of the differences, or a combination of both. The processing means can also select a plurality of windows in each image and use parallel processing to correlate the windows. In addition, the size and location of each window within an image can be varied. Different weights can also be assigned to the products or differences obtained by the correlation calculations depending on the particular relative orientation of two windows.

Two other features of the invention may be used when the processing means correlates by multiplying corresponding digital values and summing the products. First, the mean value of each window may be produced, and each digital value corrected by the mean value of its window. Second, the sum of the products may be corrected by the standard deviation of the windows.

The preferred embodiment uses only the front detecting means to determine ground velocity. The front longitudinal and lateral ground distance signals are divided by the time delay to respectively provide a longitudinal ground velocity signal and a lateral ground velocity signal. These ground velocity signals can be corrected by a pitch signal and error checked against independently determined velocity signals.

Both the first and second detecting means are used in the preferred embodiment to provide the front longitudinal and lateral ground distance signals and the rear longitudinal and lateral ground distance signals. This data can be used to determine the aircraft's ground position, flight path, angle of rotation, yaw, roll frequency and roll angle.

Several advantages are realized by producing ground velocity and ground position data in accordance with the present invention. For example, all the data is provided by internally processing overlapping images. This provides a faster update time because successive images do not have to be sampled until complete correlation is achieved. Update time is further reduced by only correlating windows of each image rather than correlating two complete images. Accuracy can be improved by deblurring the digitized images, selecting a plurality of windows in each image for parallel processing, correcting each digital value of a window by the mean value of the image, and weighting calculations depending on relative window orientation. These various features can be traded-off to optimize speed and accuracy for a particular application. Because of these many features, the present invention can measure ground velocity in two dimensions over a wide range of speeds and provide basic ground position data that can be used for a variety of aircraft ground navigational uses that require fast update times.

The invention itself, together with further objects and attendant advantages, will best be understood by reference to the following detailed description taken in conjunction with the drawings.

BRIEF DESCRIPTION OF THE DRAWINGS

FIGS. 4a and 4b are plots representing first and second digitized radiant energy images, respectively.

FIG. 5 is a plot of the final sums of the products obtained by classically correlating the images shown in FIGS. 4a and 4b.

FIG. 6 is an illustration which shows the longitudinal and lateral relative image position shift between first and second overlapping images.

FIG. 7 is a flow chart of the preferred method for determining longitudinal and lateral ground velocity of the aircraft and other navigational measurements.

DETAILED DESCRIPTION OF A PREFERRED EMBODIMENT

Figure 1:
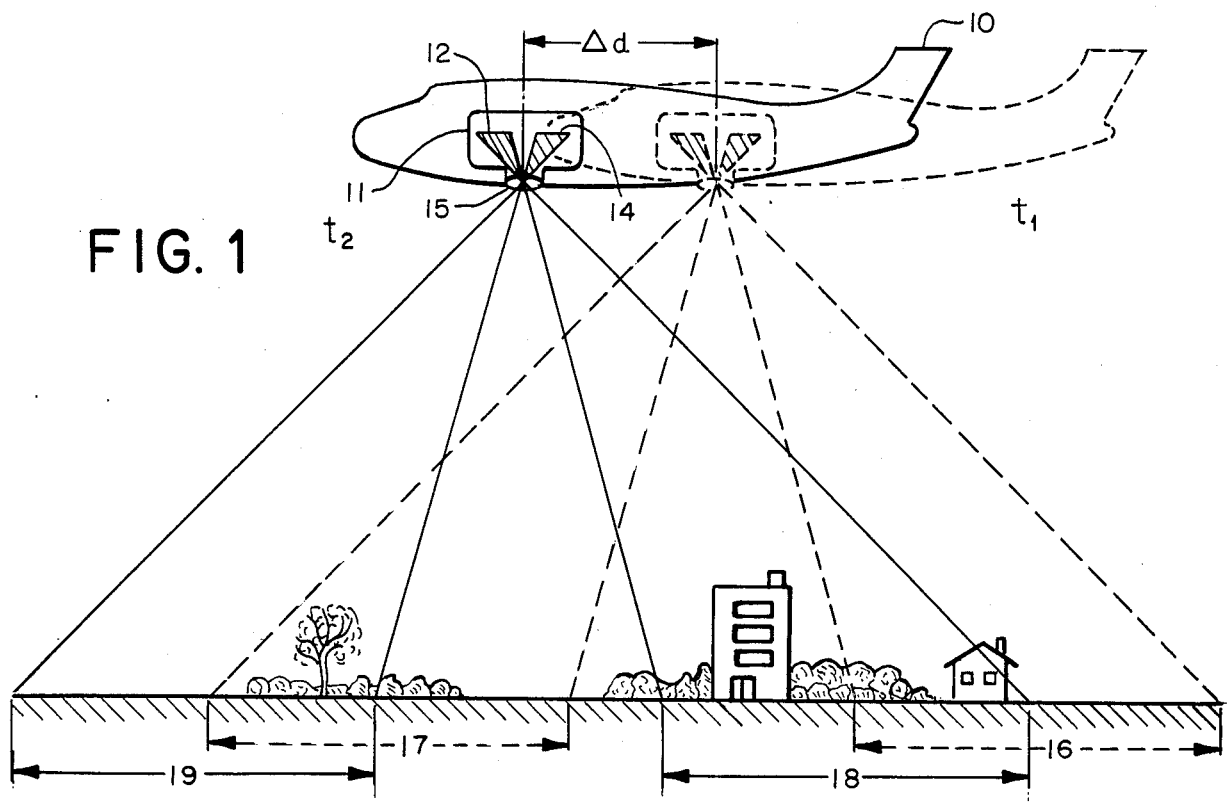
FIG. 1 is a side-view of an aircraft utilizing the present invention.

Referring now to the drawings, FIG. 1 shows a side-view of the preferred camera 11 of this invention utilized on an airplane 10. The camera 11 includes a front sensor 12 spaced apart from a back sensor 14. A lens assembly 15 focuses incident radiant energy on to the front and back sensors 12, 14. The camera 11 should be mounted near the center of rotation of the aircraft and must have a clear view of the ground (i.e. clear of the landing gear, etc.). At time $t_1$, the front sensor 12 detects the radiant energy emanating from a first front area of the earth's surface 16 and the back sensor 14 simultaneously detects the radiant energy emanating from a first back area of the earth's surface 17. At time $t_2$, the airplane has traveled the distance $\Delta d$. The front sensor 12 then detects the radiant energy emanating from a second front area of the earth's surface 18, and the back sensor 14 detects the radiant energy emanating from a second back area of the earth's surface 19. The time interval between $t_1$ and $t_2$ will be referred to as the time delay $\Delta t$. The time delay $\Delta t$ is controlled so that the radiant energy detected by the front sensor 12 and back sensor 14 emanates from overlapping areas of the earth's surface, as shown in FIG. 1.

Figure 2:
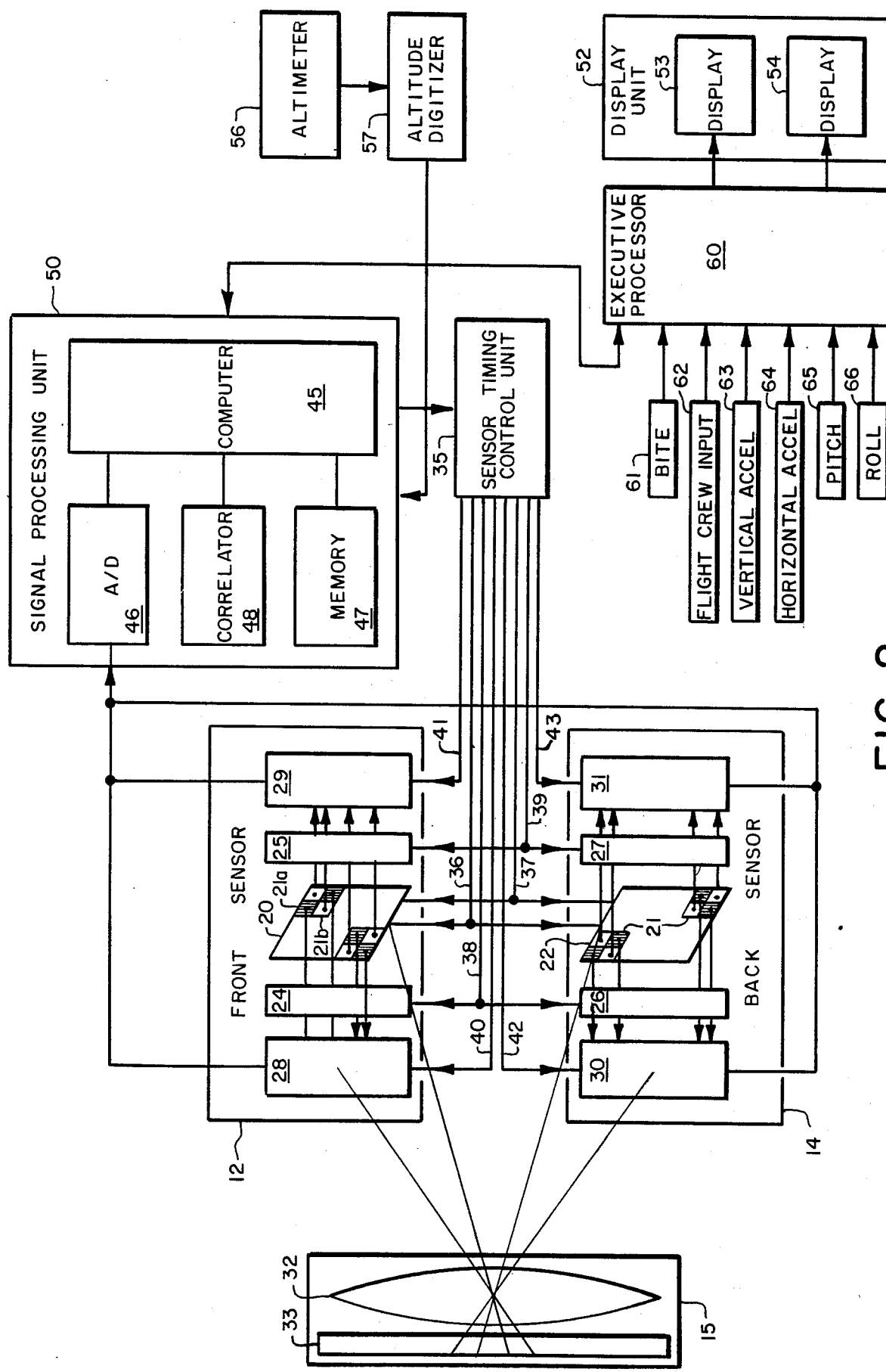
FIG. 2 is a block diagram of the preferred embodiment of the invention.

FIG. 2 shows the physical components of the preferred embodiment of the invention. All the components are conventional elements that are commercially available. It is preferred that the components used in the present invention are compact and lightweight.

The front and back sensors 12 and 14 include front and back charge coupled device (CCD) arrays 20 and 22, respectively, which are comprised of a plurality of photodetector pixels 21 arranged in a two-dimensional matrix. Each photodetector pixel 21 is a photodiode that generates an electrical signal that is proportional to the intensity of incident radiant energy. The presently preferred focal plane of each CCD sensor 20, 22 is a conventional 256×256 matrix of silicon photodiode pixels 21. Conventional silicon photodiodes are substantially responsive to visible and near infrared light. The collection of electrical signals generated by all the pixels 21 within a CCD array essentially forms a unique identifying image or "picture" of the area of ground from which the particular radiant energy emanated.

The front and back sensors 12 and 14 each include two transfer gates 24, 25 and 26, 27, respectively, and two shift registers 28, 29 and 30, 31 respectively. Each photodetector pixel is connected to a cell of a transfer gate, which is connected to the cell of a shift register. In the presently preferred embodiment, the odd-numbered pixels 21a of the front CCD array 20 are connected to the first transfer gate 24 and the first shift register 28, the even-numbered pixels 21b of the front CCD sensor 20 are connected to the second transfer gate 25 and the second shift register 29, the odd-numbered pixels 21a of the back CCD array 22 are connected to the third transfer gate 26 and the third shift register 30, and the even-numbered pixels 21b of the back CCD sensor 22 are connected to the fourth transfer gate 27 and the fourth shift register 31.

Incident radiant energy (or light) is focused on the front and back CCD arrays 20 and 22 by the lens system 15. The lens system includes a lens 32 and a filter 33. The lens 32 may be a zoom lens or variable focal length lens to maintain an adequate field of view over a range of altitudes. Alternatively, a conventional fresnel lens could be used. The simplicity of the fresnel lens minimizes the attenuation inherent in complex thick lens systems. This can be especially beneficial in low light (radiant energy) situations. Preferably, the lens 32 and filter 33 should be chosen to take advantage of the near infrared capability of the silicon photodiode pixels 21. The filter 33, for example, should effectively reject the blue wavelengths (i.e. below 0.7 microns) which are susceptible to scatter caused by rain, haze or fog.

The CCD arrays 20, 22, the transfer gates 24–27 and the shift registers 28–31 operate in response to control signals sent over the control lines 36–43 from the sensor timing control unit 35. The odd-numbered pixels 21a of the front CCD sensor 20 and the back CCD sensor 22 are simultaneously reset or enabled by a control signal on line 36, and the even-numbered pixels 21b of the front and back CCD sensors are simultaneously reset or enabled by a control signal on line 37. In response to a control signal on line 38, the first and third transfer gates 24 and 26 pass the electrical signals generated by the odd-numbered pixels 21a to the first and third shift registers 28 and 30, respectively. The second and fourth transfer gates 25 and 27, in response to a control signal on line 39, pass the signals generated by the even-numbered pixels 21b to the second and fourth shift registers 29 and 31, respectively.

The sequence of transmission of the control signals over the control lines 36–43 is determined by the sensor timing control unit 35 under the control of the computer 45. It can be seen that sequence of the reset and enable signals sent to the CCD sensors 20 and 22 over lines 36 and 37 determine the time delay $\Delta t$ and the exposure time (i.e. the length of time the photodetector pixels 21 are enabled). The time delay $\Delta t$ is defined as the interval between which the enable signals are sent to the odd-numbered pixels 21a and to the even-numbered pixels 21b of the CCD arrays 20, 22. The time delay is controlled to assure that there is overlap between the areas of the ground from which radiant energy images are formed. The exposure time is controlled to allow the pixels to collect sufficient light to generate strong signals, thereby minimizing error due to noise and other spurious signals. Long exposure times are typically required in low light conditions and at high altitudes, and short exposure times are typically required at low altitudes. One method of controlling exposure time, the average light intensity or "average mass" approach, is disclosed on pages 16–17 of in our co-pending application Ser. No. 619,062, entitled "Apparatus and Method for a Range Finder," filed June 11, 1984. Because the disclosed system is dependent on the intensity of incident light, it performs best as a low altitude navigation system.

A first front image will be formed by the odd-numbered pixels 21a of the front CCD sensor 20 and stored the first shift register 28, and a first back image will be formed by the odd-numbered pixels 21a of the back CCD array 22 and stored in the third shift register 30. A second front image will be formed by the even-numbered pixels 21b of the front CCD array 20 and stored in the second shift register 29, and a second back image will be formed by the even-numbered pixels 21b of the back CCD array 22 and stored in the fourth shift register 31. The contents of the shift registers 28–31 are shifted to the signal processing unit 50 in response to a control signal on their respective control lines 40–43.

The pixel signals forming the images stored in the shift registers 28–31 and input to the signal processing unit 50 are in analog form. The signal processing unit 50 contains an analog-to-digital converter (ADC) 46 which digitizes the analog values of the images. The digitized images are stored in the memory 47. The computer 45 and correlator 48 then cooperate to process the digitized images to produce ground position data from which velocity and other navigational measurements can be made.

As a preliminary step, however, the images may be deblurred if their data is spatially blurred due to integration of the pixels while the aircraft was moving. This motion blurring problem was explained in the Background of the Invention. The blurred scene has all the information of an unblurred scene, but it is spread out over a number of pixels. Given the velocity of the aircraft and the exposure time of the pixels, the present invention can deblur an image to find the amplitude of the unblurred pixel value using the deconvolution formula:

$$X(i) = \sum_{n=0}^{p} y(i - nk) - \sum_{n=0}^{p} y(i - 1 - nk)$$

where X(i) is the unblurred value of pixel i, y(i) is the blurred value of pixel i, k is the number of pixels receiving light from a point source due to the velocity of the aircraft, and p equals i(max)/k. The variable k is determined by multiplying the aircraft velocity, the exposure time, and an altitude correction factor. The velocity used to calculate k could be the previous ground speed measurement or the air speed.

While it appears to be a laborious task to deblur the image data by this deconvolution method, it is just number crunching since all the values of y are known and in digital format. The computer 45 just locates and sums the proper values to produce the deblurred image.

The blurred motion problem and the deconvolution solution provided by the present invention will be explained in conjunction with the following example. If the aircraft is moving at 100 ft/sec at an altitude where 1 ft=1 pixel and the exposure time is 0.04 seconds, then the scene will be blurred by 100 ft/sec×0.04 sec×1 pixel/ft=4 pixels. Thus, k=4. This means that a point source of light will be recorded as a bar of 4 pixels, each pixel having an exposure level ¼th the level to be expected by a record of the stationary scene.

Since the charge stored in the respective pixels is due to the scene amplitude, the following model will hold. Let the radiant energy from a scene be described on a pixel by pixel basis as:

| Pixel:  | 1 | 2 | 3 | 4 | 5 | 6 | 7 | 8 | 9 | 10 | 11 | 12 | 13 | 14 | |
|---|---|---|---|---|---|---|---|---|---|---|---|---|---|---|---|
| Charge: | a | b | c | d | e | f | g | h | i | j | k | l | m | — | at time T |
|  | a | b | c | d | e | f | g | h | i | j | k | l | m | at time T + t |
|  |   | a | b | c | d | e | f | g | h | i | j | k | l | at time T + 2t |
|  |   |   | a | b | c | d | e | f | g | h | i | j | k | at end of exposure |

(The sum of each column = total exposure of each pixel due to blurring.)

If the sensor 12 or 14 took a still photograph of the earth's surface, Pixel 1 detects charge "a" (thus, $X(1)=a$), Pixel 2 detects charge "b" (i.e. $X(2)=b$), Pixel 3 detects charge "c" (i.e., $X(3)=c$), etc. However, since the aircraft has moved a distance equivalent to three pixels during the exposure period, the image has become blurred over four pixels. Pixel 1 still detects only charge "a" (thus $y(1)=a$), but Pixel 2 detects charges "a" and "b" (i.e. $y(2)=b+a$), Pixel 3 detects charges "a", "b" and "c" (i.e. $y(3)=c+b+a$), etc. By using the above deconvolution formula, the computer 45 can deblur the image. For example, $y(6)-y(5)=(f+e+d+c)-(e+d+c+b)$ or "$f-b$". But, $y(2)-y(1)=(b+a)-(a)$ or "$b$". Thus, the difference of $[y(6)+y(2)]$ and $[y(5)+y(1)]$ is the deblurred charge "f". Note that 6−2 and 5−1 are equal the variable k, the number of pixels over which the charge is blurred.

The computer 45 can be programmed to perform the deblurring calculation only when blurring could present a problem (e.g. when there are long exposure times). This enhances the feature definition and provides more accurate correlation calculations. The digital values of the deblurred images would then be used to produce the desired ground position data, as will be explained now.

Figure 3:
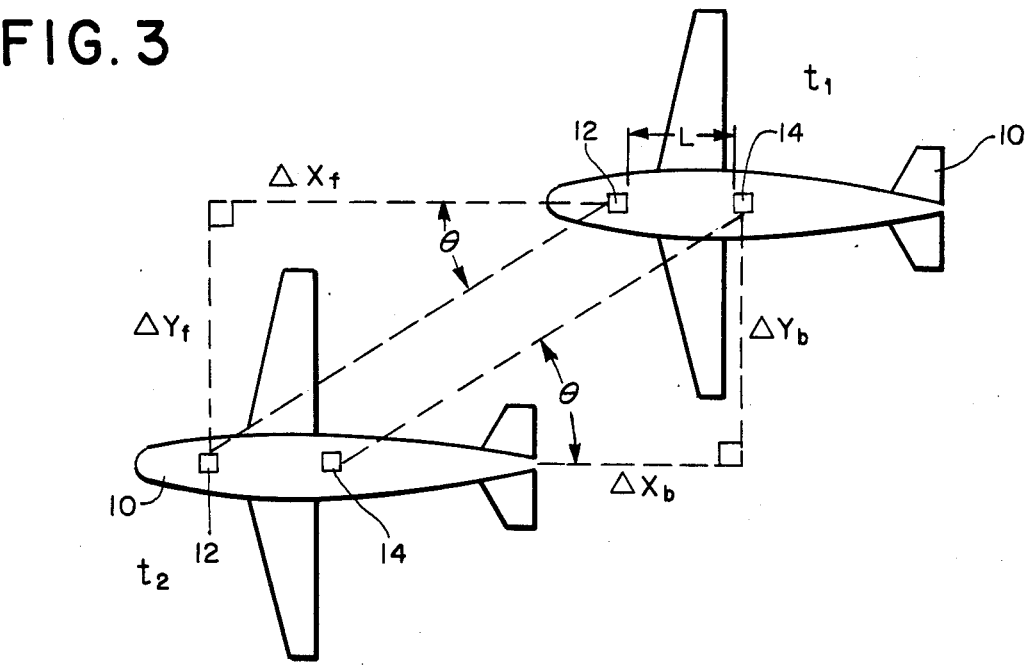
FIG. 3 is an illustration showing the distance the aircraft has traveled with respect to the ground between $t_1$ and $t_2$.

The desired ground position data is determined from the relative image position shift between the first and second front images and the relative image position shift between the first and second back images. Referring to FIG. 3, during the time delay Δt the aircraft and its sensors 12, 14, can move longitudinally ($\Delta X_f, \Delta X_b$) and laterally ($\Delta Y_f, \Delta Y_b$) with respect to the ground. Thus, the second front and second back images of the earth's surface can be displaced both longitudinally and laterally with respect to the first front and first back images of the earth's surface, respectively. The relative image position is the number of pixels in which features in a first image are relatively displaced in a second, overlapping image. The computer 45 and the correlator 48 process the first and second front images to determine the front longitudinal relative image position shift $\Delta NX_f$ and the front lateral relative image position shift $\Delta NY_f$, and the first and second back images to determine the back longitudinal relative image position shift $\Delta NX_b$ and the back lateral relative image position shift $\Delta NY_b$. The front longitudinal image position shift $\Delta NX_f$, for example, represents the number of pixels a feature in the first front image has been displaced in the second front image in the longitudinal direction of the aircraft.

Presently, it is preferred that the relative image position shift signals be computed by the computer 45, and if necessary, the correlator 48, using a classical (or true) correlation calculation, a differencing correlation calculation, or a combination of the two. The computer 45 can be any conventional microprocessor that is capable of performing the required computations within the time constraints of the aircraft. An Intel 8085 or its equivalent should suffice. A conventional correlator 48 which can perform correlation functions on two sets of digital data may be necessary for the classical correlation calculation. These two components should be shock mounted into the aircraft 10.

The two-dimensional relative image position shift of the overlapping front or back images can be determined using the classical cross-correlation formula:

$$R(u,v) = \sum_{x=0}^{k} \sum_{y=0}^{l} S(x,y) \cdot W(x+u, y+v)$$

In a sense, the cross-correlation function represents the relative amount of agreement between two functions for various degrees of misalignment (shifting). Applying the above equation to the front images, for example, the function $S(x,y)$ represents the first front image, the function $W(x+u, y+v)$ represents the second front image, u is a measure of the degree of longitudinal shift between the first and second front images, and v is a measure of the degree of lateral shift between the first and second front images. $R(u,v)$ reflects the degree of similarity between the first and scond front images shifted by u and v pixels. The longitudinal relative image position shift $\Delta NX$ and the lateral relative image position shift $\Delta NY$ respectively represent the values of u and v (i.e. number of pixel shifts) that maximize the cross-correlation function $R(u,v)$.

For purposes of explaining the classical correlation function, as well as the differencing correlation function explained below, reference will be only made to the first and second images generally where the discussion holds true for both the first and second front images and the first and second back images. Reference will also be made to FIGS. 4a and 4b, which represent first and second deblurred, digitized, overlapping images. FIG. 4a shows randomly generated digital test data which may represent a first image (front or back) that was formed by the odd-numbered pixels of one of the CCD sensors. FIG. 4b contains the data from FIG. 4a which has been shifted longitudinally (i.e. horizontally) and laterally (i.e. vertically) and has been contaminated by a noise factor. Where FIGS. 4a and 4b do not overlap, FIG. 4b has been filled in with random numbers. Thus, FIG. 4b represents a second overlapping image formed by the even-numbered pixels of a CCD sensor.

Solving R(u,v) using the above equation is quite rigorous. The solution to this equation for two linear radiant energy contours is disclosed in our copending application Ser. No. 619,062, Apparatus and Method for a Range Finder, pages 10–14. However, applying that solution to the present invention would require multiplying each pixel of the first digitized image with its corresponding pixel of the second digitized image over each image-to-image orientation. For example, the first pixels of the top row of the images are multiplied together, the second pixels of the top row are multiplied together, and so on for each row of the overlapping images. The products are summed together. Then the second image is shifted by one pixel rightwardly relative to the first image, and the multiplication-summation-shift process is repeated until the second image has been shifted through every pixel of the first image, row-by-row. The maximum sum of the products obtained would represent the maximum degree of correlation for the two images. The number of horizontal and vertical pixel shifts necessary to achieve this maximum degree of correlation would represent the longitudinal relative image position shift $\Delta NX$ and the lateral relative image position shift $\Delta NY$, respectively.

While this classical correlation method will produce the relative image position shift components $\Delta NX$ and $\Delta NY$ for two overlapping images, it requires a large number of calculations. For example, if the CCD arrays were 100-by-100 pixels, $100 \times 100 \times 100 \times 100 = 1 \times 10^8$ multiplication-summation calculations would be required to solve for the maximum degree of correlation. If the computer 45 and correlator 48 require 150 nanoseconds for one multiplication-summation operation, $1 \times 10^8$ operations would require 15 seconds, which is far too long for a reasonable update time.

To provide a much shorter update time, the present invention uses various windowing techniques. In particular, the computer 45 is programmed to select a small window from the first image (e.g. $20 \times 20$ pixel window from a $100 \times 100$ pixel image). This window is correlated and shifted through the second image. The classical product-summation correlation calculation, the differencing correlation calculation explained below, or some combination of the two may be used. The relative image position shift components $\Delta NX$ and $\Delta NY$ are then determined from the pixel shaft that provide the maximum degree of correlation for the window. The number of product-summation operations required to correlate a $20 \times 20$ window through a $100 \times 100$ matrix is: $20 \times 20 \times (100 - 20 + 1)^2 = 2.624 \times 10^6$, or 0.02624 times the original value. This means that the same 150 ns device can compute the correlation between two $100 \times 100$ pixel images in 0.39 seconds. This method has been shown to provide accurate results in test programs.

To still further reduce update time, the present invention also provides for selecting a projected window in the second image through which the first window is correlated. The projected window (or search area) would be the area of the second image where the first window would be mostly likely to appear. The computer 45 selects the size and location of the projected window based on the last velocity determination of the aircraft, the direction of the aircraft, the maximum acceleration of aircraft and the update time. This information tells the number of pixels the aircraft can travel in the longitudinal and lateral directions during the update time and where the window is most likely to appear. The size of the projected window should be as small as possible but large enough to assure that it will contain the window and its point of maximum degree of correlation. A lot of time is saved by only searching through a projected window because you avoid searching in an area where the aircraft is not heading. For example, if the $20 \times 20$ first window was correlated through a $40 \times 40$ projected window, the number of product-summation operations would be: $20 \times 20 \times (40 - 20 + 1)^2 = 1.764 \times 10^5$, or 0.001764 times the original value and approximately 7% of the single window method.

Figure 7A:
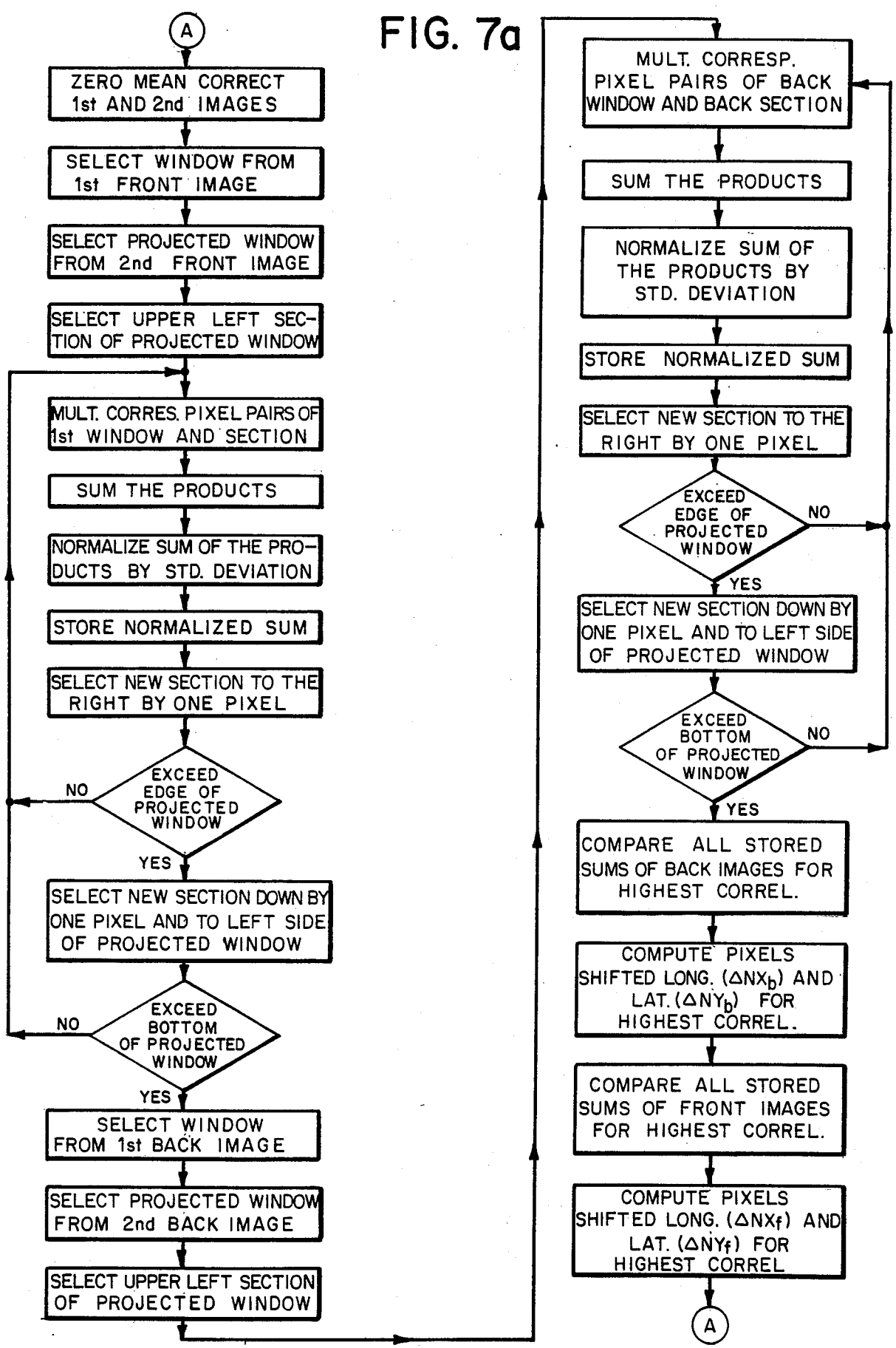
FIGS. 7a–7c are various methods of the present invention for determining the relative image position shift signals.

Referring now to FIGS. 4a, 4b and 7a, a method for classically correlating two overlapping, digitized and deblurred images will now be described. As a preliminary step, the computer 45 will determine the mean values of the first image and the second image by summing the pixel values of each image and dividing the sum by the number of pixels in the respective image. Each pixel in the first image is then subtracted by the mean value of the first image, and each pixel in the second image is subtracted by the mean value of the second image. The zero-mean corrected pixel values of each image will then range between a positive maximum value (e.g. $+150$) and a maximum negative value (e.g. $-150$). Zero-mean correction makes magnitude of the numbers more manageable and provides more accurate correlations because the multiplication of identical weak signals (e.g. $-10 \times -10 = 100$) will be of equal significance to identical strong signals (e.g. $10 \times 10 = 100$). Without zero-mean correction, weak signals (e.g. $1 \times 1 = 1$) would less significant than strong signals (e.g. $10 \times 10 = 100$), even though they provide the same degree of correlation.

The computer 45 selects a window from the first digitized image. The size of the window will depend on the update time necessary for the particular application. If a short update time is needed for a fast aircraft, the size of the window should be small to minimize the number of product-summation operations. If, however, a longer update time is available, the window size may be enlarged to increase the probability of including prominent ground objects and thereby improve accuracy. For example, if the aircraft is flying over a relatively uniform terrain (e.g. a desert), the window should be large enough to include the radiant energy signals representing any prominent objects (e.g. a clump of sagebrush). In FIG. 4a, a $4 \times 4$ window has been selected.

The computer 45 also determines the location of the first window within the first image. The window location should be in favor of the expected direction of movement so that it will be found in the overlapping area of the second image. The location can be varied to improve speed and accuracy. For example, the window could be chosen from the end of the first image which is most probable to appear in the second image in light of the given velocity and direction of the aircraft. The window must also be selected to avoid covering a prominant object connected to the aircraft (e.g. landing gear) and appearing in both the first and second images. Otherwise, the system would correlate on itself and there would be no change in direction to measure. Prominent objects fixed to the aircraft may be avoided by selecting the window from the periphery of the image, or an operator input could be supplied to select the window location. In FIG. 4a, the window is selected from the center of the first image, with its upper left-hand corner at row 7, column 7.

FIG. 4b can be thought of as representing a non-zero-mean corrected 16×16 projected window of a 256×256 second, overlapping image. The computer 45 selects the leftmost-uppermost section of the projected window which is the same size as the first window. The computer 45 (or correlator 48) then multiplies the corresponding pixels pairs of the first window and the section. The computer 45 (or correlator 48) sums all the products as they are computed. Specifically, the computer (or correlator) multiplies corresponding pixel pairs beginning in the upper left-hand corner of the window and section and continues multiplying the adjacent corresponding pixel pairs row-by-row. Next, the computer 45 computes the standard deviation of the first window and the section and divides (normalizes) the final sum of the products for the window and section by the standard deviation. Normalizing the sum produces a number between $-1$ and 1. This makes the magnitude of the numbers more manageable for the computer 45. For example, if the sums ranged between 10,000 and $-10,000$, large registers would be required to store the data, thereby increasing costs, or less significant digits would be truncated, thereby impairing accuracy. The normalized sum is stored in the memory unit 47.

Next, the computer 45 selects a new section in the projected window, which is one pixel to the right of the previous section (or the first window can be thought of as shifted with respect to the projected window by one pixel), and repeats the multiplication-summation-normalization-store operation. Before each shift though, the computer checks to see that the new section has not exceeded the edge of the projected window (i.e. column 16). If it has, a new section is selected that begins at the leftmost edge of the projected window (i.e. column 1) but one pixel below the last row. The computer then checks to see that the bottom row of the new section does not extend past the bottom of the projected window (i.e row 16). If it does, the first window has been shifted and correlated through every pixel of the projected window. If it does not, the multiplication-summation-normalization-store process is repeated for the corresponding pixel pairs of the first window and the new section. This process is repeated until the first window has been shifted and correlated through every pixel location of the projected window.

FIG. 5 is a plot illustrating the final sum of the products for each orientation of the first window of FIG. 4a shifted through the projected window of FIG. 4b. The sums have been adjusted by multiplying them by ten, rounding off them to whole numbers, and truncating the negative sums to zero. Note that there are three less rows and columns in FIG. 5 to account for the size (4×4 pixels) of the first window.

It is a straightforward matter for the computer 45 to compare all stored final sum of the products values to identify the greatest sum. In FIG. 5 the highest sum of the products is the value "9" at column 10, row 4. Since the first window was shifted through the projected window from left to right, top to bottom, the position of sum "9" corresponds to the upper left-hand corner of the first window. Thus, the highest correlation between the first window of FIG. 4a, and the projected window of FIG. 4b requires a relative image position shift of three pixels in the horizontal or longitudinal direction ($\Delta NX = 3$) and $-3$ pixels in the vertical or lateral direction ($\Delta NY = -3$). FIG. 6 graphically shows the relationship of the longitudinal relative image position shift $\Delta NX$ and the lateral relative image position shift $\Delta NY$ for the first window and its corresponding section in the projected window, which has been superimposed on the first image for illustration.

The final sum of the product values, as shown in FIG. 5, represent a digital integration of the classical cross-correlation function for first and second overlapping radiant energy images. The magnitude of each sum represents the amount of agreement or similarity between the first window and a section of the projected window. For the test data shown in FIGS. 4a and 4b, the sum "9" shown in FIG. 4 represents at least 90% correlation between the first window and its corresponding section of the projected window. If the first window and its corresponding section were identical, the digital cross-correlation process would theoretically yield 100% correlation. Less than perfect correlation was achieved with this test data due to the noise factor, which should be expected in a practical implementation of the invention. Nevertheless, noise and other spurious signals should not hinder the present invention because it only seeks the highest relative degree of correlation between two overlapping images (or windows thereof), and not 100% or some other predetermined degree of correlation. Thus, new images do not have to be repetitively sampled and correlated if a predetermined degree of correlation is not achieved.

Referring now to FIG. 7a, it can be seen that the correlation operation just described can be applied equally well to overlapping first and second front images and to overlapping first and second back images to respectively determine the front longitudinal relative image position shift $\Delta NX_f$, the front lateral relative image position shift $\Delta NY_f$, the back longitudinal relative image position shift $\Delta NX_b$ and the back lateral relative image position shift signal $\Delta NY_b$.

Test programs have shown that the multiplication-summation operation explained above will produce accurate image position shift signals $\Delta NX$ and $\Delta NY$ when the window and projected window data are zero-mean corrected and the final sums of products are normalized. However, the multiplication calculations, apart from the zero-mean and standard deviation computations, are time consuming for the computer 45. Thus, in a fast aircraft where a fast update time is necessary, the computer may be programmed to determine the maximum degree correlation between two overlapping images using a differencing correlation technique.

A differencing correlation calculation will now be described in conjunction with FIGS. 4a, 4b, and 7b. Assume that FIG. 4a represents part of a first 256×256 pixel image and that FIG. 4b represents a projected window of an overlapping second 256×256 pixel image. In the same manner described above, a first window is selected from the first image and the uppermost-leftmost section of the projected window is chosen. Each pixel value in the first window is then subtracted from its corresponding pixel value in the section. The absolute value of the differences are summed as they are computed and the accumulated sum is compared with a predetermined theshold as each difference is summed. If the accumulated sum exceeds the threshold within a predetermined number of calculations, it is rejected as representing a poor correlation.

If the final accumulated sum is less than the threshold (the final accumulated sum will be zero if these is perfect correlation), it may be multiplied by a weighting factor which varies according to the location of the section. The projected window, by necessity must be larger than the area where the first window is expected to appear. Sums obtained from correlation calculations near the periphery of the projected window may be multiplied by a high weight factor. (In a classical correlation, low weight factors would be used near the fringe of the projected window.) A lower weight factor would be used as the section was selected nearer to the area of the projected window where maximum correlation is expected. The weighted sum is then stored in the memory 47.

Next, the window is shifted to a new section which is one pixel to the right of the previous section, and the subtract-accumulate operation is repeated. Each time the window is shifted, the computer 45 is programmed to determine whether the window has exceeded the right edge or the bottom of the projected window, in the same manner described above. The subtract-accumulate operation is repeated until the window has been shifted through every pixel of the projected window. The lowest adjusted sum stored will represent the maximum degree of correlation between the first window and the projected window. The computer 45 determines the number of pixel shifts necessary for the first window to coincide with the section of the projected window corresponding to the maximum degree of correlation, in the same manner described above, to produce the longitudinal relative image position shift signal $\Delta NX$ and the lateral relative image position shift signal $\Delta NY$.

The computer 45 sets the comparison threshold experimentally. For example, the threshold may be initially set at 100. If none of the accumulated sums of difference is less than 100 after the first window has been correlated and shifted through the projected window, the threshold will be increased. The first window will then be difference correlated through the projected window again to find the lowest relative accumulated sum of the differences, which represents the maximum degree of correlation between the first window and the projected window. Since the threshold can be easily adjusted, the differencing correlation method will be functional even in very noisy environments.

The differencing correlation method is faster than a classical correlation method, even without normalization, because there is no multiplication. On the other hand, a differencing correlation method is not as accurate as the classical correlation method. Where accuracy and speed can be traded off, the computer 45 can be programmed to perform either a classical correlation calculation or a differencing correlation calculation. This is illustrated in FIG. 7c. The computer 45 is programmed to first determine whether a fast update time is necessary. If so, a differencing correlation calculation is performed. If not, a classical correlation will be performed with both zero-mean correction and normalization. Both the classical correlation and a differencing correlation will provide a longitudinal relative image position shift signal $\Delta NX$ and a lateral relative image position shift signal $\Delta NY$ based on the highest degree of correlation between a window from the first image and an overlapping second image, in the manner described above.

Alternatively, the computer 45 could be programmed to combine a classical correlation and a differencing correlation to take advantage of accuracy and speed. For example, a first window of a first image should be shifted and correlated through every pixel orientation of a projected window of a second overlapping image using the differencing correlation method. Only those final sum of the difference values that are below the threshold would be retained. The classical correlation calculation could then be computed for the first window and the projected window at the window/projected window orientations corresponding to the retained sum of the difference values. This would provide a more accurate correlation than a pure differencing correlation, but one which is be faster than a pure classical correlation calculation.

Figure 8:
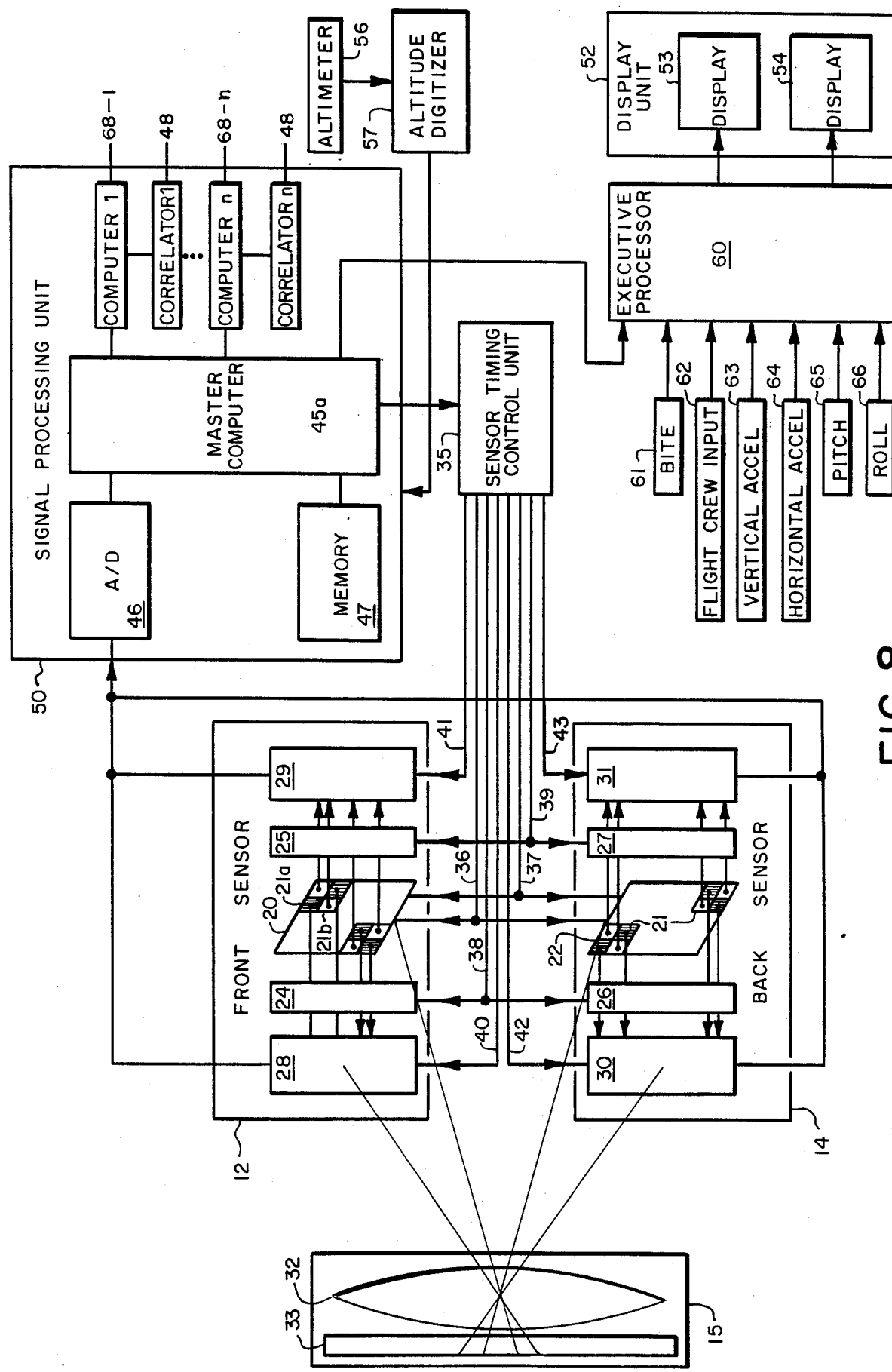
FIG. 8 is a block diagram of an alternate embodiment of the present invention.
Figure 9:
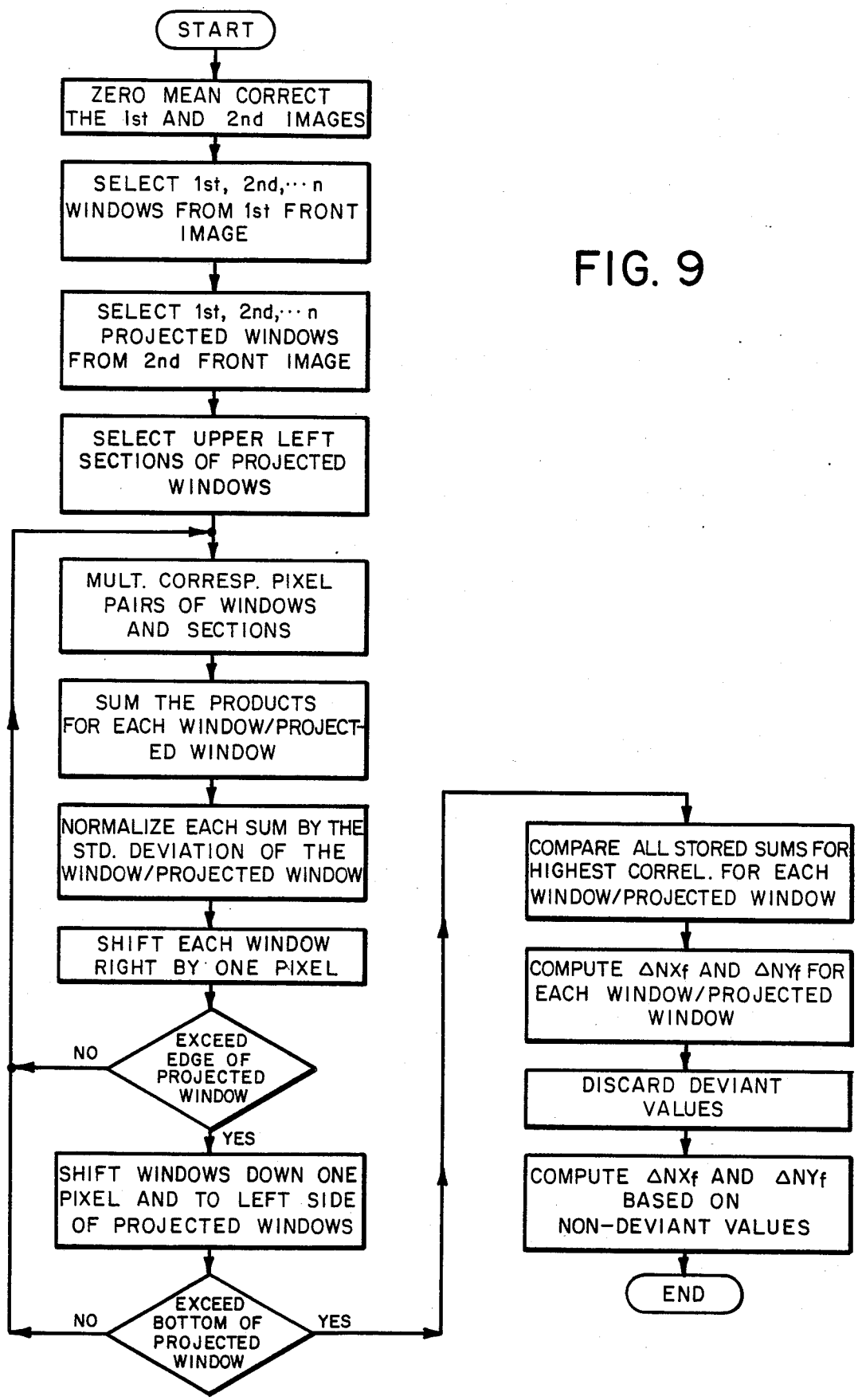
FIG. 9 is a flow chart for determining the relative image position shift signals with alternate embodiment of the present invention.

Another embodiment of the present invention for determining the relative position shift between two overlapping images is shown in FIGS. 8 and 9. The components shown in FIG. 8 are identical in structure and function to those shown in FIG. 2, with the exception of the master computer 45a which may be a conventional microprocessor. The parallel computers 68 are similar in structure and function to the computer 45 of FIG. 2. For purposes of explanation, assume that the FIGS. 4a and 4b represent complete overlapping first and second front images. The master computer 45a selects a plurality of non-overlapping first windows in the first image of FIG. 4a and a corresponding plurality of non-overlapping projected windows in the second image of FIG. 4b. For example, a first 4×4 window may be selected from the first image with its upper left corner beginning at row 3, column 3, and a second 4×4 window may be selected from the first image with its upper left corner beginning at row 3, column 11. A first 6×8 projected window may be selected from the second image with its upper left corner beginning at row 8, column 1, and a second projected window may be selected from the second image with its upper left corner beginning at row 8, column 7. The windows and projected windows are selected based on the same constraints previously explained. The master processor 45a then assigns the first window and the first projected window to the first parallel computer 68-1 and the second window and the second projected window to the second parallel computer 68-2. Each parallel computer 68 classically correlates, in parallel, its assigned window through its respective projected window, in the manner described above, to determine the relative image position shift that produces the maximum degree of correlation between the window and its respective projected window.

Each window/projected window correlation produces a longitudinal relative image position shift signal and a lateral relative image position shift signal. For example, the parallel computers 68-1 and 68-2 may produce the following relative image position shift signals:

ΔNX (1)=3 and ΔNY (1)=5, ΔNX (2)=2 and ΔNY (2)=5. The master computer 45a can be programmed to average these longitudinal and lateral position shift signals to produce a composite longitudinal position shift signal ΔNX and a lateral position shift signal ΔNY for the first and second images. Alternatively, the master computer 45a can be programmed with voting logic that rejects longitudinal or lateral relative image shift signals which significantly deviate from expected values based on the known direction, maximum acceleration, update time and last velocity determination of the aircraft. The composite longitudinal and lateral position shift signals can the be determined from the non-deviant values.

If all the first windows are in a linear relationship with respect to each other, the longitudinal and lateral position shift signals produced by each window/projected window could be resolved trigonometrically to determine the rotation of the aircraft. On the other hand, if the windows are not in a straight line, the rotation of the aircraft can still be resolved, but a different trigonometric function would be required for each window. It can be seen that the parallel processing technique may be particularly well suited for an aircraft that rotates frequently (e.g. a helicopter).

As many window/projected window pairs may be selected from first and second overlapping images as there are parallel computers 68. (Of course, the windows could be processed sequentially, but this would be slower). It is presently preferred to use as many small windows as possible. More windows provide better coverage of the images, which improves accuracy. Moreover, the smaller windows provide faster update times because less calculations are needed.

It can be seen from the foregoing that the present invention affords a variety of ways to determine the relative image position shift between two overlapping images. It will be apparent to those skilled in the art that many of these features can be used, omitted or combined (e.g. normalization, projected windows, differencing correlation) to trade-off speed versus accuracy to meet the needs of the particular application. Once the longitudinal and lateral image position shift signals are computed, regardless of the method, they are easily translated into ground distance signals.

To compute the distance the aircraft has traveled with respect to the ground, the signal processing unit 50 is provided with a digital altitude signal from a conventional radar altimeter 56 and digitizer 57. The altitude signal (actually, the height above ground signal) should be accurate to within 1%. Referring to FIG. 2, the computer 45 corrects the front longitudinal relative image position shift signal $\Delta NX_f$, the front lateral relative image position shift signal $\Delta NY_f$, the back longitudinal relative image position shift signal $\Delta NX_b$ and the back lateral relative image position shift signal $\Delta NY_b$ by the altitude signal and the focal length-to-image ratio of the lens 32 to respectively produce a front longitudinal ground distance signal $\Delta X_f$, a front lateral ground distance signal $\Delta Y_f$, a back longitudinal ground distance signal $\Delta X_b$ and a back lateral ground distance signal $\Delta Y_b$. These ground distance signals represent the distance the aircraft has moved with respect to the ground in the time interval Δt, as illustrated in FIG. 3.

The ground distance signals and the value of the time delay Δt are fed from the computer 45 to an executive processor 60 which calculates the longitudinal and lateral ground velocities of the aircraft as well as other navigational measurements based on ground distance and time.

The distance traveled by the aircraft 100 (Δd) is the square root of the sum of $\Delta Y_f$ and $\Delta X_f$ squared (or the square root of $\Delta Y_b$ and $\Delta X_b$ squared). The executive processor 60 divides the aircraft ground distance Δd by the time delay Δt to determine the ground velocity of the aircraft. Moreover, the lateral and longitudinal ground velocity components ΔY/Δt and ΔX/Δt, respectively, are easily computed by the executive processor 60.

The ground distance signals $\Delta X_f$, $\Delta Y_f$, $\Delta X_b$, and $\Delta Y_b$ can be used by the executive processor 60 to determine many navigational measurements requiring ground position and/or velocity reference with fast update capability. Some of these navigational measurements will now be explained.

The aircraft's yaw angle θ can be determined from the arctangent of $\Delta Y_f/\Delta X_f$ (or $\Delta Y_b/\Delta X_b$) multiplied by a radian. See FIGS. 3 and 6.

The angular rotation of the aircraft can be determined by solving the unbalanced shift that occurs between the front and back images. The executive processor 60 can calculate the rotation angle (ψ) using the formula:

$$\psi = \text{arctangent } (\Delta Y_f - \Delta Y_b)/(\Delta X_f - \Delta X_b - L)$$

where L is the distance separating the front and back sensors. If the front and back CCD sensors 20, 22 are 100×100 pixels and are separated by 100 pixels, there would be a 200 pixel baseline between the centers of the front CCD sensor 20 and the back CCD sensor 22. Thus, by resolving the unbalanced shift to one pixel and using the above equation, the angular rotation of the aircraft can be resolved to 1/200 of a pixel, which provides an angular resolution of approximately 0.5°. By continuously computing the angular rotation of aircraft for sequential overlapping images the angular orientation of the aircraft with respect to a known initial orientation will be known. Moreover, by dividing the angular rotation angle ψ by the time delay Δt, the rotational velocity of the aircraft can be determined.

A history of the lateral and longitudinal ground distance signals can be computed to determine the flight path of the aircraft with respect to the ground. That is, the executive processor 60 could be programmed to determine how far the aircraft has traveled laterally and longitudinally with respect to a known starting point. FIG. 6 shows how the direction of travel can be determined from the relative image distance vectors. Either the front sensor 12, the back sensor 14, or a point in between may be used as the aircraft reference point for the ground tracking calculations. Some error can be expected between the actual ground track of the aircraft and the computed ground track if the reference point is not at the aircraft's center of gravity, which always changes.

Some possible uses for ground tracking data are navigational mapping of the aircraft (i.e. determine its position on a navigational map), geodetic surveying and speed calibration. Surveying could be performed by flying the aircraft directly in line with a potential boundary line (e.g. a road) and comparing the flight path with a map of the actual boundary line. Deviations between the flight path and the actual boundary line could be recorded. The measured ground speed of the aircraft could also be to measure airspeed and to calibrate airspeed measuring instruments.

The ground tracking data can also be used for stability and control of the aircraft, for example, by determining its roll frequency. If the aircraft 10 is rolling along its longitudinal axis defined by its fuselage, the distance signals $\Delta X_f$, $\Delta Y_f$, $\Delta X_b$, $\Delta Y_b$ will produce a sinusoidal flight path with respect to the ground that is parallel to the direction of the aircraft 10. Specifically, the lateral ground signals $\Delta Y$ becomes increasingly negative as the aircraft rolls starboard and increasingly positive as it rolls portside, even though the aircraft may not have moved laterally. The frequency of this sinusoidal signal equals the roll frequency of the aircraft. Thus, the roll frequency may be determined from the ground distance signals, standard trigonometric functions, and the time delay $\Delta_t$. In addition, the roll angle, which is equal to the arctangent of the amplitude of the sinusoidal path divided by the altitude of the aircraft, may be readily computed.

Referring again to FIG. 2, the executive processor 60 is provided with a variety of inputs that may be used in computing the ground distance signals $\Delta X_f$, $\Delta Y_f$, $\Delta X_b$, $\Delta Y_b$. The BITE (built-in test equipment) input 61 provides data, such as normal cruise velocity forward, normal cruise velocity lateral and airspeed, that can be used to error check the computed ground speed data to see if it is way out of line. (The cruise velocity data could also be used by the computer 45 in selecting the size and location of a projected window.) The BITE 61 can also provide signals that may check the operating status of various components of the system, such as the computer 45 and the camera 11.

Flight crew input 62 could include pilot feedback and flight director data for error checking data in the same manner as the BITE input 61. The flight crew could also input information that the aircraft is in hover mode or automatic altitude control so that input from the altimeter 56 is not necessary. Manual window selection, to avoid a fixed object connected to the aircraft, could also be input by the flight crew.

The vertical acceleration input 63 is intended to be used to correct the update time of altitude input.

The horizontal acceleration input 64 is used to select the size and location of a projected window and to error check the computed acceleration value.

The pitch input 65 and the roll input 66 are used to correct the computed longitudinal and lateral ground distance values, respectively. For example, if the aircraft pitches or rolls upwardly between the first and second overlapping images, the ground distance signal would be inordinately large because the second image is formed from light emanating from an area far from beneath the aircraft. The executive processor 60 could be programmed to correct the ground distance signals by the pitch or roll frequency when this occurs.

The ground velocity, ground distance and other navigational measurements can be output by the executive processor 60 to the display unit 52. The display unit 52 may include a digital display 53 and an analog display 54. The executive processor 60 includes a digital to analog converter (DAC) (not shown) to convert the digital data to analog form for output to the analog display 54. In addition to conventional analog and digital displays, other displays may be developed or adapted to provide a plot of the aircraft's track with respect to the ground.

The operation of the present invention to compute the longitudinal and lateral ground distance signals of an aircraft will now be described in conjunction with FIGS. 2, 7, 7a-7c.

Upon activation of the system, the signal processing unit 50 initializes the predetermined variables of the system. The sensor timing control unit 35 also sets an initial exposure time for the CCD sensors 20, 22 as a function of the initial altitude (actually, height above ground) of the aircraft 10.

The control unit 35 then sends a start signal over control line 36 to simultaneously reset and enable the odd-numbered pixels 21a of the front and back CCD sensors 20 and 22. The odd-numbered pixels generate analog electromagnetic signals in response to incident light, thereby forming a first front radiant energy image and a first back radiant energy image. After the time delay $\Delta t$, the control unit 35 sends a control signal over line 37 to simultaneously reset and enable the even-numbered pixels 21b of the front and back CCD sensors 20 and 22. The even-numbered pixels 21b also generate electromagnetic signals in response to incident light, thereby forming a second front radiant energy image, which overlaps with the first front radiant energy image, and a second back radiant energy image, which overlaps the first back radiant energy image.

After the odd-numbered pixels have been enabled for a length of time corresponding to the exposure time, the control unit 35 sends a signal over line 38 to the first and third transfer gates 24 and 26, thereby allowing the signals generated by the odd-numbered pixels to be transferred to the first and third shift registers 28 and 30. The signals generated by the even-numbered pixels 21b are simultaneously transferred to the second and fourth shift registers 29 and 31 via the second and fourth transfer gates 25 and 27 in response to a control signal on line 39, which the control unit 35 generates after the even-numbered pixels have been enabled for the exposure time.

The first shift register 28 outputs the stored first front image to the analog-to-digital converter 46 in response to a control signal on line 40. Similarly, the sensor timing control unit 35 generates sequential signals on control lines 42, 42 and 43, which respectively command the second shift register 29 to output the stored second front image to the ADC 46, the third shift register 30 to output the stored first back image to the ADC 46, and the fourth shift register 31 to output the stored second back image to the ADC 46. The ADC 46 digitizes the analog values of each image, and the computer 45 stores each digitized image in the memory 47.

The computer 45 will then determine whether any or all of the images need to be deblurred. If so, the computer will deblur the value of each pixel location in an image using the deconvolution equation in the manner previously described. The computer 45, the memory 47, and possibly the correlator 48, then cooperate to compare the first and second front and back digitized images to determine the relative position shift between them.

Figure 7B:
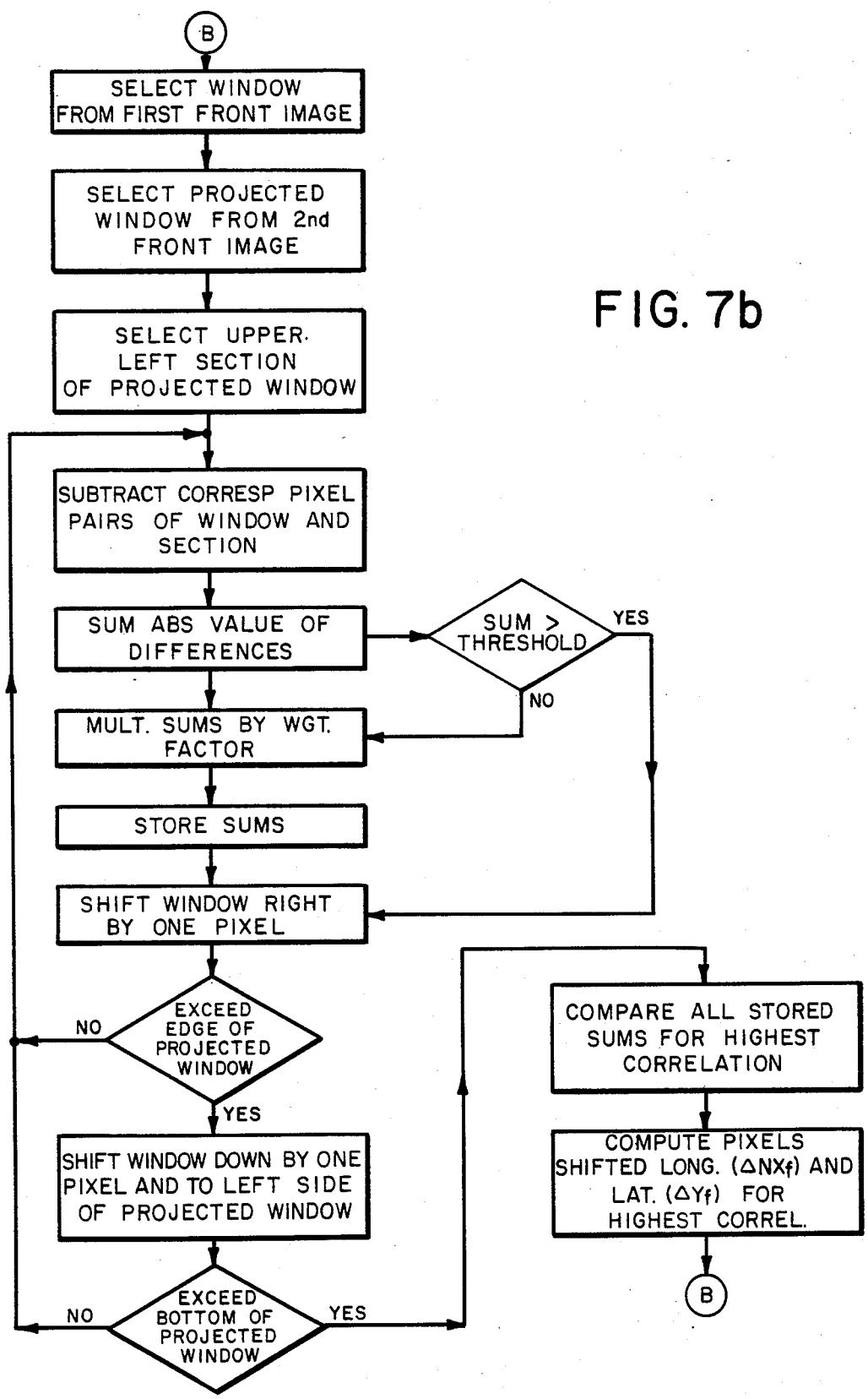
Figure 7C:
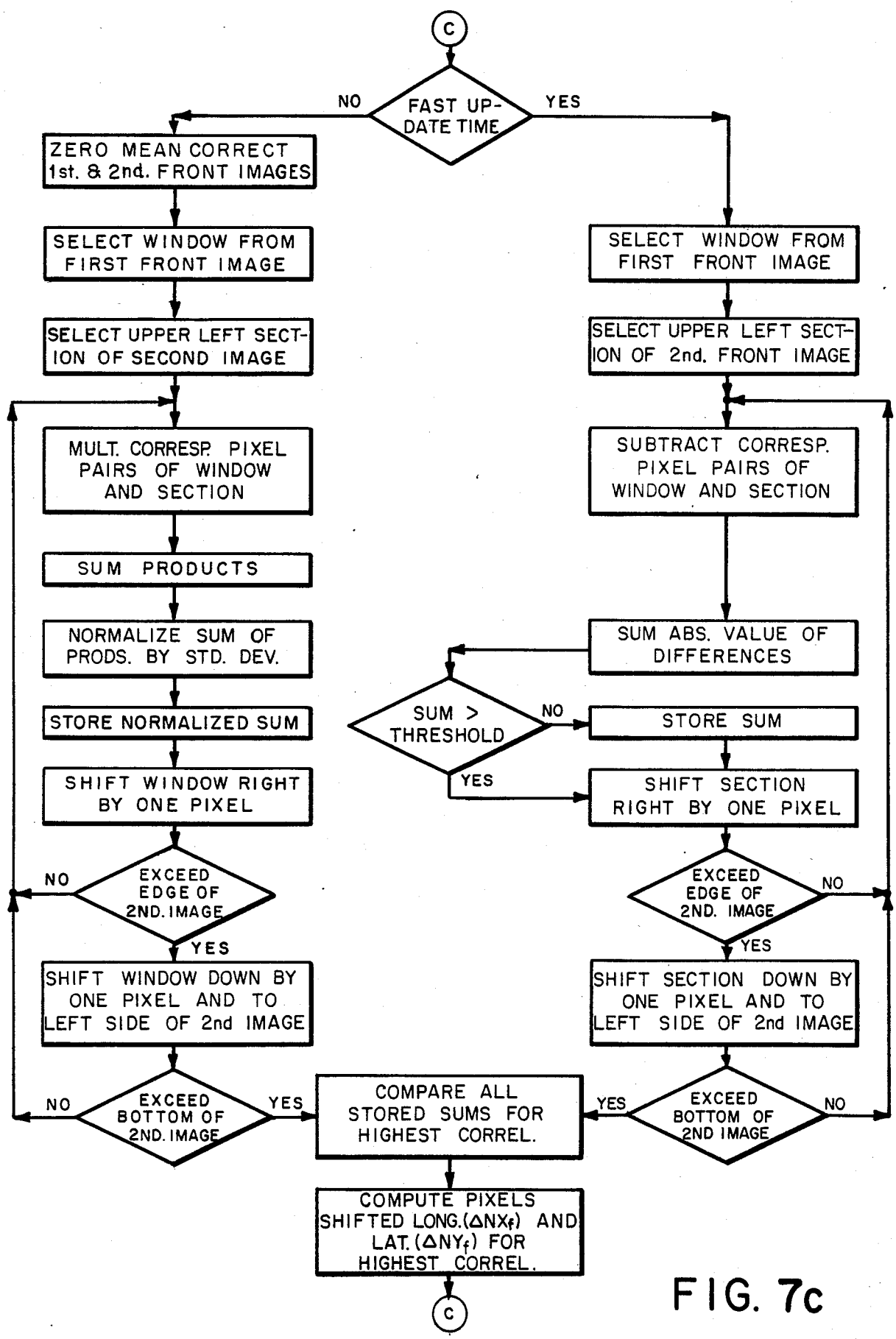

The computer 45 can be programmed to use one of the methods shown in FIGS. 7a-7c, or a variation of any of them, to determine the relative image position shift between the first and second front and back images.

If the method shown in FIG. 7a is used, the computer 45 first zero-mean corrects the first front image, the second front image, the front back image, and the second back image. Next, the computer selects a window from the first front image and a projected window from the second front image. The computer 45 (and the correlator 48, if used) then proceeds to digitally classically correlate the corresponding pixel pairs of the front window and the projected window, beginning with the uppermost-leftmost section of the projected window that is the same size as the front window. Each pixel in the front window is multiplied by its corresponding pixel in the section, the products are summed, and the sum of the products is normalized and stored in the memory 47. A new section of the projected window is then selected which is one pixel to the right of the previous section, and the multiplication-summation process is repeated. Each time a new section is selected, the computer checks to see that it does not exceed the right edge or the bottom edge of the projected window. If it does not, the multiplication-summation-shift process is repeated. When the computer 45 determines that the new section exceeds the right edge of the projected window, it selects a new section that begins at the left edge of the projected window and is one row below the last section. When the computer determines that the new section extends beyond the bottom of the projected window, it selects a window from the first back image and a projected window from the second back image. The computer then repeats the multiplication-summation-normalization-store-shift process that was used for the front images for the back window and back projected window.

After the back window has been correlated and shifted through the back projected window, the computer 45 compares all the stored sum of the product values obtained to find the greatest sum, which corresponds to the maximum degree of correlation. The number of pixels shifted longitudinally and laterally to achieve the highest correlation will respectively represent the back longitudinal relative image position shift signal $\Delta NX_b$ and the back lateral relative image position shift signal $\Delta NY_b$. Next, the computer compares all the stored sum of the product values obtained with the front windows to find the greatest sum, which represents the maximum degree of correlation of those two images. The number of pixels shifted longitudinally and laterally to attain the maximum degree of correlation will respectively represent the front longitudinal relative image position shift signal $\Delta NX_f$ and the front lateral relative image position shift signal $\Delta NY_f$.

Alternatively, the method used in FIG. 7b could be used. In this differencing correlation method, reference will only be made to the first front and second front images. It will be understood that the same process could then be repeated for the first and second back images.

The computer 45 first selects a window from the first front image and a projected window from the second front image. Next, the uppermost-leftmost section of the projected window, which is the same dimensions as the first window, is selected. The computer 45 then subtracts corresponding pixel values of the window and section and accumulates the differences. As each difference is accumulated, it is compared with a predetermined threshold. If the accumulated sum is greater than the threshold, it is discarded and the window is then shifted to a new section which is one pixel to the right of the previous section. If the final accumulated sum of the differences is less than the threshold, it is multiplied by a weight factor, which varies according to its location in the projected window. The weighted sum is then stored, and the window is then shifted to the right by one pixel. The subtract-accumulate-compare-shift process is then repeated for every pixel location in the projected window. Each time the window is shifted, the computer checks to see that it does not exceed the right edge or the bottom of the projected window. When the window exceeds the right edge of the projected window, it is shifted to a new section that is one row below the last section and begins at the left side of the projected window. When the window exceeds the bottom of the projected window, the subtract-accumulate-shift process has been completed. The computer 45 then compares all the stored sums to find the lowest value, which represents to the maximum degree of correlation between the two images. The number of pixels shifted longitudinally and laterally to obtain the highest degree of correlation will respectively represent the front longitudinal relative image position shift $\Delta NX_f$ and the front lateral relative image position shift $\Delta NY_f$.

If the method illustrated in FIG. 7c is used for computing the relative image position shift for the first and second front images (or first and second back images), the computer 45 first determines whether a fast update time is necessary. If it is, the computer then selects a window from the first front image. Next, the computer selects the uppermost-leftmost section of the second front image which is the same size as the window. The computer then proceeds to determine the front relative image position shift and the front lateral relative image position shift in the same manner described in FIG. 7b, except that the first window is difference correlated through the entire second image and not a projected window. Another difference is that the final accumulated sum of the differences are not multiplied by a weight factor.

If the computer determines that a fast update time is not necessary, it first zero-mean corrects the first and second front images. Next, a window is selected from the first front image and the uppermost-leftmost section of the second image is selected that is the same size as the window. The computer 45 then proceeds to classically correlate the window through the entire second image, in the same manner as explained in FIG. 7a for the front images, to determine the front longitudinal relative image position shift $\Delta NX_f$ and the front lateral relative image position shift $\Delta NY_f$.

The alternate embodiment of the invention illustrated in FIGS. 8 and 9 will now be described. The first and second front and back images are formed, digitized and deblurred in the same manner described above in connection with FIG. 7. FIG. 9 illustrates the various steps that the alternate embodiment may execute in computing the relative image position shift of the first and second front images. It will be understood that the relative image position shift signals of the back images would be determined in the same fashion.

The master compute 45a first zero-mean corrects the first and second front images. Next, the master computer 45a selects a plurality of windows from the first front image and a corresponding plurality of projected windows from the second front image. The uppermost-leftmost sections of each projected window, that are the same size as their corresponding first windows, are then selected. The corresponding pixel pairs of each first window and its respective section are multiplied together, and the products are summed. The sum of the products for each window/projected window are normalized by the standard deviation of the respective window/projected window. Next, the computer shifts each first window to the right of its respective projected window by one pixel. The multiply-sum-normalize-shift operation is then be repeated for each pixel location of the projected windows. Each time a window is shifted, its respective parallel processor 68 checks to see if it exceeds the right edge or the bottom of its projected window. If it exceeds the right edge, it is shifted to a new section of the projected window beginning at the left edge of the projected window and one row below the previous section. If the bottom edge of the projected window is exceeded, the parallel processor compares all the stored sums to find the greatest one, which represents the highest degree of correlation for that window/projected window combination. The parallel processor then computes the number of pixels shifted longitudinally and laterally to obtain the highest degree of correlation which represents the longitudinal and lateral relative image position shift signals $\Delta NX_f(1)$, $\Delta NY_f(1)$, respectively, for that window/projected window combination.

After all the parallel processors 68 have computed their respective longitudinal and lateral relative image position shift signals, the master computer 45a compares all the values. Any deviant values are discarded. The executive processor 45a then computes the composite front longitudinal relative image position shift signal $\Delta NX_f$ and the front composite lateral relative image position shift signal $\Delta NY_f$ based on the values that were not discarded.

Referring again to FIG. 7, after the front and back lateral and longitudinal relative image position shift signals have been computed by one of the above methods, or a combination thereof, the computer 45 computes the ground distance signals. Specifically, the computer 45 corrects the front longitudinal position shift signal $\Delta NX_f$, the front lateral image position shift signal $\Delta NY_f$, the back longitudinal image position shift signal $\Delta NX_b$, and the back lateral image position shift signal $\Delta NY_b$ by an altitude correction factor to respectively produce the front longitudinal ground distance signal $\Delta X_f$, the front lateral ground distance signal $\Delta Y_f$, the back longitudinal ground distance signal $\Delta X_b$, and the back lateral ground distance signal $\Delta Y_b$.

The ground distance data and the time delay $\Delta t$ are then input to the executive processor 60. The executive processor 60 computes the longitudinal and lateral velocities of the aircraft and other navigational measurements (e.g. rotation) based on this data. The executive processor 60 may error check the computed data with its BITE input 61 or its flight crew input 62 to see if any of the computed ground distance data is erroneous. The executive processor 60 may also correct the computed ground distance data by its pitch input 65 or its roll input 66.

The executive processor outputs the computed navigational values which are correct to the display unit 52. The erroneous values are discarded. The exposure time and the time delay $\Delta t$ may then be adjusted and the entire process may then be repeated for new sampled front and back overlapping images.

It will be appreciated that various changes and modifications to the above-described embodiments can be made without departing from the spirit and scope of the present invention. For example, the computer 45 can be modified to accept all the inputs and outputs currently connected to the executive processor 60 and then be programmed to compute all the navigational measurements that the executive processor makes. Additional control lines could be added between the sensor timing and control unit 35 and the CCD arrays 20, 22 and transfer gates 24-27 so that the odd-numbered pixels and the even-number pixels of the front and back CCD arrays do not have to be reset and enabled simultaneously. The computer 45 and timing unit 35 could be programmed so that each image is formed sequentially and/or concurrently. A rotational acceleration input, if available, could be added to the executive processor 60 to aid in selecting a projected window. And, of course, it should be understood that the term aircraft is not limited to airplanes but can include any airborne vehicle or object (e.g. a missile).

Another modification of the present invention which is currently under consideration is the use of a 256×256 CCD array made by Reticon, which has a sleuthing function. This type of sensor allows selected rows of a detected image, such the rows corresponding to a window or a projected window, to be stored. Rows of data which are not needed (e.g. rows 1-100) are destroyed as soon as they are read into the shift register. The selected rows (e.g. rows 101-256) would be shifted into the signal processing unit. This type of image sensor would save time because it is quicker to sweep through rows of unneeded data than to store them.

It should be understood that various other changes and modifications to the preferred embodiment disclosed herein will be apparent to those skilled in the art. Such changes and modifications can be made without departing from the spirit and the scope of the present invention and without diminishing its attendant advantages. It is, therefore, intended that the foregoing detailed description be regarded as illustrative rather than limiting, and that it be understood that it is the following claims, including all equivalents, which are intended to define the scope of this invention.

We claim:

1. An apparatus for determining the ground velocity of an aircraft comprising:
   means for detecting a first two-dimensional radiant energy image of a first area of the earth's surface, and following a time delay, a second two-dimensional radiant energy image of a second area of the earth's surface which overlaps the first area;
   means for producing an altitude signal;
   means for processing the first and second overlapping images and the altitude signal to produce a longitudinal ground distance signal and a lateral ground distance signal; and
   the process means generating a longitudinal ground velocity signal and a lateral ground velocity signal based on the longitudinal and lateral ground distance signals, respectively, and the time delay.

2. The apparatus of claim 1 wherein the processing means includes:
   means for selecting a window in the first image;
   means for comparing the window with the second image to generate a longitudinal position shift signal and a lateral position shift signal;
   means for multiplying the longitudinal position shift signal and the lateral position shift signal by the altitude signal to generate the longitudinal ground distance signal and the lateral ground distance signal, respectively; and
   means for dividing the longitudinal ground distance signal and the lateral ground distance signal by the time delay to generate the longitudinal ground velocity signal and the lateral ground velocity signal, respectively.

3. The apparatus of claim 1 wherein the processing means includes:
   means for selecting a first window in the first image;
   means for selecting a second window in the secind image;
   means for comparing the first window with the second window to generate a longitudinal position shift signal and a lateral position shift signal;
   means for multiplying the longitudinal position shift signal and the lateral position shift signal by the altitude signal to generate the longitudinal ground distance signal and the lateral ground distance signal, respectively; and
   means for dividing the longitudinal ground distance signal and lateral ground distance signal by the time delay to generate the longitudinal ground velocity signal and the lateral ground velocity signal, respectively.

4. An apparatus for determining the ground velocity of an aircraft comprising:
   means for forming a first two-dimensional radiant energy image of a first area of the earth's surface, and after a time delay, a second two-dimensional radiant energy image of a second area of the earth's surface which overlaps the first area;
   means for digitizing the first image and the second image into a plurality of discrete values;
   means for selecting a first window from the first image;
   means for selecting a second window from the second image, wherein the second window is bigger than the first window;
   means for correlating the first window and the second window to produce a longitudinal position shift signal and a lateral position shift signal;
   means for producing an altitude correction signal;
   means for multiplying the longitudinal position shift signal and the lateral position shift signal by the altitude correction signal to produce a longitudinal ground distance signal and lateral ground distance signal; and
   means for dividing the longitudinal ground distance signal and the lateral ground distance signal by the time delay to produce a longitudinal ground velocity signal and a lateral ground velocity signal.

5. An apparatus for providing ground position data for navigation of an aircraft comprising:
   front means for detecting a first front two-dimensional radiant energy image of a first front area of the earth's surface, and following a time delay, a second front two-dimensional radiant energy image of a second front area of the earth's surface, which overlaps the first front area;
   back means for detecting a first back two-dimensional radiant energy image of a first back area of the earth's surface, and following the time delay, a second back two-dimensional radiant energy image of a second back area of the earth's surface which overlaps the first back area;
   the front and back detecting means cooperating such that the first front and first back images are detected concurrently and the second front and second back images are detected concurrently;
   means for producing an altitude signal; and
   means for processing the first and second front overlapping images and the altitude signal to produce a front longitudinal ground distance signal and a front lateral ground distance signal, and the first and second back images and the altitude signal to generate a back longitudinal ground distance signal and a back lateral ground distance signal.

6. The apparatus of claim 5 wherein the processing means includes:
   means for selecting a first window in the first front image and a second window in the first back image;
   means for comparing the first window with the second front image to produce a front longitudinal position shift signal and a front lateral position shift signal, and the second window with the second back image to produce a back longitudinal position shift signal and a back lateral position shift signal; and
   means for multiplying the front lateral position shift signal, the front longitudinal position shift signal, the back longitudinal position shift signal and the back lateral position shift signal by the altitude signal to respectively produce the front longitudinal ground distance signal, the front lateral ground distance signal, the back longitudinal ground distance signal and the back lateral ground distance signal.

7. The apparatus of claim 5 wherein the processing means includes:
   means for selecting a first front window in the first front image, a second front window in the second front image, a first back window in the first back image and a second back window in the second back image;
   means for comparing the first front window with the second front window to produce a front longitudinal position shift signal and a front lateral position shift signal, and the first back window with the second back window to produce a back longitudinal position shift signal and a back lateral position shift signal; and
   means for multiplying the front longitudinal position shift signal, the front lateral position shift signal, the back longitudinal position shift signal and the back lateral position shift signal by the altitude signal to respectively produce the front longitudinal ground distance signal, the front lateral ground distance signal, the back longitudinal ground distance signal and the back lateral ground distance signal.

8. An apparatus for providing positional data for navigation of an aircraft comprising:
   front means for forming a first front two-dimensional radiant energy image of a first front area of the earth's surface, and following a time delay, a second front two-dimensional radiant energy image of a second front area of the earth's surface which overlaps the first front area;
   back means for forming a first back two-dimensional radiant energy image of a first back area of the earth's surface, and following the time delay, a second back two-dimensional radiant energy image of a second back area of the earth's surface which overlaps the first back area;
   the front and back forming means cooperating such that the first front and first back images are formed concurrently and the second front and second back images are formed concurrently;

means for digitizing the first front image, the second front image, the first back image and the second back image into a plurality of discrete values;

first means for selecting a first front window and a first back window from the first front and first back images, respectively;

second means for selecting a second front window and a second back window from the second front and second back images, respectively;

means for correlating the first front window with the second front window to generate a front longitudinal position shift signal and a front lateral position shift signal, and the first back window with the second back window to generate a back longitudinal position shift signal and a back lateral position shift signal;

means for generating an altitude signal; and means for correcting the front longitudinal position shift signal, the front lateral position shift signal, the back longitudinal position shift signal, and the back lateral position shift signal by the altitude signal to respectively generate a front longitudinal ground distance signal, a front lateral ground distance signal, a back longitudinal ground distance signal and a back lateral distance signal.

* * * * *